US012231648B2

(12) United States Patent
Bandyopadhyay et al.

(10) Patent No.: US 12,231,648 B2
(45) Date of Patent: Feb. 18, 2025

(54) METHODS, ARCHITECTURES, APPARATUSES AND SYSTEMS DIRECTED TO IMPROVED LINEAR MODEL ESTIMATION FOR TEMPLATE BASED VIDEO CODING

(71) Applicant: InterDigital VC Holdings, Inc., Wilmington, DE (US)

(72) Inventors: Saurav Bandyopadhyay, San Diego, CA (US); Xiaoyu Xiu, San Diego, CA (US); Yuwen He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/417,274

(22) Filed: Jan. 19, 2024

(65) Prior Publication Data
US 2024/0171748 A1    May 23, 2024

Related U.S. Application Data

(63) Continuation of application No. 17/415,176, filed as application No. PCT/US2019/068038 on Dec. 20, 2019, now Pat. No. 11,909,977.
(Continued)

(51) Int. Cl.
*H04N 19/132*    (2014.01)
*H04N 19/105*    (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11)

(58) Field of Classification Search
CPC .. H04N 19/105; H04N 19/132; H04N 19/176; H04N 19/186; H04N 19/42; H04N 19/593
See application file for complete search history.

(56) References Cited

U.S. PATENT DOCUMENTS

2014/0294078 A1    10/2014  Seregin et al.
2015/0373372 A1*   12/2015  He ..................... H04N 19/176
                                                           375/240.12
(Continued)

FOREIGN PATENT DOCUMENTS

CN        102067543 A      5/2011
CN        103891279 A      6/2014
(Continued)

OTHER PUBLICATIONS

"Enhanced Cross-Component Linear Model for Chroma Intra-Prediction in Video Coding"—Kai Zhang, Jianle Chen, Li Zhang, Xiang Li, Marta Karczewicz; IEEE Transactions on Image Processing, vol. 27, No. 8, Aug. 2018. (Year: 2018).*
(Continued)

*Primary Examiner* — Mainul Hasan
(74) *Attorney, Agent, or Firm* — Smadar Gefen

(57) ABSTRACT

Procedures, methods, architectures, apparatuses, systems, devices, and computer program products directed to improved linear model estimation for template-based video coding are provided. Included therein is a method comprising determining minimum and maximum ("min/max") values of luma and chroma samples neighboring a coding block, wherein the min/max chroma values correspond to the min/max luma values; determining a first linear model parameter of a template-based video coding technique (i) based on a single look-up table and the min/max chroma values and (ii) at a precision no greater than 16 bits; determining a second linear model parameter of the tem-
(Continued)

plate-based video coding technique (i) based on the first linear model parameter and the minimum chroma and luma values and (ii) at a precision no greater than 16 bits; and predicting chroma samples of the coding block based on reconstructed luma samples of the coding block and the first and second linear model parameters.

20 Claims, 20 Drawing Sheets

Related U.S. Application Data

(60) Provisional application No. 62/784,341, filed on Dec. 21, 2018.

(51) Int. Cl.
  *H04N 19/176* (2014.01)
  *H04N 19/186* (2014.01)

(56) References Cited

U.S. PATENT DOCUMENTS

| | | | | |
|---|---|---|---|---|
| 2018/0077426 | A1* | 3/2018 | Zhang | H04N 19/157 |
| 2020/0154115 | A1* | 5/2020 | Ramasubramanian | H04N 19/176 |
| 2020/0195959 | A1* | 6/2020 | Zhang | H04N 19/52 |
| 2020/0195986 | A1* | 6/2020 | Zhao | H04N 19/186 |
| 2021/0258572 | A1* | 8/2021 | Zhang | H04N 19/157 |
| 2021/0297656 | A1* | 9/2021 | Ma | H04N 19/11 |
| 2022/0053192 | A1* | 2/2022 | Zhang | H04N 19/82 |

FOREIGN PATENT DOCUMENTS

| | | | | |
|---|---|---|---|---|
| CN | 104255033 | A | 12/2014 | |
| CN | 104471946 | A | 3/2015 | |
| CN | 105075259 | A | 11/2015 | |
| CN | 106464877 | A | 2/2017 | |
| CN | 106664410 | A | 5/2017 | |
| CN | 106717004 | A | 5/2017 | |
| WO | WO2018194190 | A1 | 10/2018 | |
| WO | WO-2019162118 | A1 * | 8/2019 | H04N 19/103 |
| WO | WO-2020108591 | A1 * | 6/2020 | H04N 19/13 |

OTHER PUBLICATIONS

"Multi-model Based Cross-component Linear Model Chroma Intra-prediction for Video Coding"—Kai Zhang, Jianle Chen, Li Zhang, Xiang Li, Marta Karczewicz; IEEE VCIP 2017, Dec. 10-13, 2017, St Petersburg, U.S.A. (Year: 2017).*
Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.
Chen et al., "Coding Tools Investigation for Next Generation Video Coding", ITU-T SG16, COM 16-C 806, Feb. 2015, 7 pages.
"VTM-3.0 Reference Software", available at <https://vcgit.hhi.fraunhofer.de/jvet/VVCSoftware_VTM/tags/VTM-3.0>, pp. 1-2.
Ma et al., "CE3-related: CCLM Coefficients derivation method without down-sampling operations", JVET Meeting, Oct. 3-12, 2018, Macao, No. JVET-L0341, Oct. 7, 2018, 4 pages.
Segall et al., "Joint Call for Proposals on Video Compression with Capability beyond HEVC", Joint Video Exploration Team (JVET) of ITU-T SG 16 WP 3 and ISO/IEC JTC 1/SC 29/WG 11, Doc. JVET-H1002 (v6), 8th Meeting: Macao, CN, Oct. 18-24, 2017, 27 pages.
SMPTE 421M, "VC-1 Compressed Video Bitstream Format and Decoding Process", SMPTE Standard, Approved Feb. 24, 2006, 493 pages.
Zhang, et al., Enhanced Cross-Component Linear Model for Chroma Intra-Prediction in Video Coding, IEEE Transactions on Image Processing, vol. 27, No. 8, pp. 3983-3997, Aug. 2018.
Bross, "Versatile Video Coding (Draft 1)", Joint Video Experts Team (JVET) of ITU-T SG 16 WP 3 and ISO/IEC JTC 1/SC 29/WG 11, Document: JVET-J1001-v2, 10th Meeting: San Diego, California, United States, Apr. 10, 2018, 43 pages.
Alshina et. al., "Known Tools Performance Investigation for Next Generation Video Coding", ITU—Telecommunications Standardization Sector, Video Coding Experts Group (VCEG), SG16/Q6, Power Point Presentation, VCEG-AZ05, Jun. 2015, 9 pages.
Schwarz et al., "CE7: Transform Coefficient Coding and Dependent Quantization (Tests 7.1.2, 7.2.1)", JVET of ITU-T SG16 WP3 and ISO/IEC JTC1/SC/29/WG11, 11th Meeting, Ljubljana, SI, Jul. 10-18, 2018, Document: JVET-K0071, 22 pages.
ITU-T Recommendation H.264, "Series H: Audiovisual and Multimedia Systems Infrastructure of audiovisual services—Coding of moving video, Advanced video coding for generic audiovisual services", Telecommunication Standardization Sector of ITU, Nov. 2007, 564 pages.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document JVET-G1001-v1, 7th Meeting: Torino, Italy, Jul. 13, 2017, 48 pages.
"BMS-2.0 Reference Software", available at <https://vcgit.hhi.fraunhofer.de/jvet/VVCSoftware_BMS/tags/BMS-2.1rc1>, 1 page.
"JEM-7.0 Reference Software", Available at <https://jvet.hhi.fraunhofer.de/svn/svn_HMJEMSoftware/tags/HM-16.6-JEM-7.0>, 1 page.
Laroche et al., "CE3-5.1: On cross-component linear model simplification", Joint Video Experts Team (JVET) of ITU-T SG 16 WP 3 and ISO/IEC JTC 1/SC 29/WG 11, 12th Meeting, Macao, CN, Oct. 3-12, 2018, Document: JVET-L0191, 4 pages.
Laroche et al., CE3: Cross-Component Linear Model Simplification (Test 5.1), 12th JVET Meeting, Oct. 3, 2018-Oct. 12, 2018, Macao, (The Joint Video Exploration Team of ISO/IEC JTC1/SC29/WG11 and ITU-T SG.16), No. JVET-L0191, Oct. 7, 2018.
Tourapis et al., "H.264/14496-10 Avc Reference Software Manual", Joint Video Team (JVT) of ISO/IEC MPEG & ITU-T VCEG (ISO/IEC JTC1/SC29/WG01 and ITU-T SG16 Q.6), Document JVT-AE010, 31st Meeting, London, United Kingdom, Jun. 28, 2009, 90 pages.
Bross et al., "High Efficiency Video Coding (HEVC) text specification draft 10 (For FDIS & Consent)", Joint Collaborative Team on Video Coding (JCT-VC) of ITU-T SG 16 WP 3 and ISO/IEC JTC 1/SC 29/WG 11, Document: JCTVC-L1003_v1, 12th Meeting: Geneva, CH, Jan. 14-23, 2013, 321 pages.
Francois et al., "CE3-related: Reducing the number of reference samples and table size in LM Chroma process", 125. MPEG Meeting, Jan. 14-18, 2019, Marrakech; (MPEG or ISO/IEC JTC1/SC29/WG11), No. m45367, Jan. 2, 2019, 10 pages.
"VTM-2.0.1 reference software", available at https://vcgit.hhi.fraunhofer.de/jvet/VVCSoftware_VTM/tags/VTM-2.0.1.
Ohm et al., "Report of AHG on Future Video Coding Standardization Challenges", International Organisation for Standardisation Organisation Internationale De Normalisation ISO/IEC JTC1/SC29/WG11 Coding of Moving Pictures and Audio, ISO/IEC JTC1/SC29/WG11 MPEG2014/M36782, Jun. 2015, Warsaw, Poland, 4 pages.
"HM Reference Software HM-16.9", available at <https://hevc.hhi.fraunhofer.de/svn/svn_HEVCSoftware>, Mar. 2016, 2 pages.
Bordes et al., "CE4-related: LIC with reduced memory buffer", Joint Video Experts Team (JVET) of ITU-T SG 16 WP 3 and ISO/IED JTC 1/SC 29/WG 11, Document: JVET-L0203-v3, 12th Meeting, Macao, China, Oct. 3, 2018, 6 pages.
Chen et al., "Chroma intra prediction by scale luma samples using integer operations", 3. JCT-VC Meeting, 84. MPEG Meeting Oct. 7-15, 2010, Guangzhou, JCT on VC of ISO/IEC JTC1/SC29/WG11 and ITU-T SG.16, No. JCTVC-C206, Oct. 2, 2010, 7 pages.

(56) References Cited

OTHER PUBLICATIONS

Sullivan et al., "Overview of the High Efficiency Video Coding (HEVC) Standard", Institute of Electrical and Electronics Engineers (IEEE), IEEE Transactions on Circuits and Systems for Video Technology, vol. 22, No. 12, Dec. 2012, 19 pages.

* cited by examiner

Example Local Illumination Compensation (LIC)

Example Locations of Samples Used for Derivation of $\alpha$ and $\beta$

Example Straight Line between Minimum and Maximum Luma Value

Example LIC Min-max based Linear Model Offset Computation

Example LM above Mode

Example LM Left Mode

Example Multi-Model LIC min-Max Based Linear Model

Example Multi-Model Vs. Single-Model LIC Based on Centroid Distance

METHODS, ARCHITECTURES, APPARATUSES AND SYSTEMS DIRECTED TO IMPROVED LINEAR MODEL ESTIMATION FOR TEMPLATE BASED VIDEO CODING

CROSS-REFERENCE TO RELATED APPLICATIONS

This application is a Continuation of U.S. application Ser. No. 17/415,176, filed Jun. 17, 2021, which is a National Phase entry under 35 U.S.C. § 371 of International Application No. PCT/US2019/068038, filed Dec. 20, 2019, which claims benefit under 35 U.S.C. § 119(e) from U.S. Provisional Patent Application Ser. No. 62/784,341, filed Dec. 21, 2018, which is hereby incorporated by reference in its entirety.

BACKGROUND

Video coding systems may be used to compress digital video signals, e.g., to reduce the storage and/or transmission bandwidth needed for such signals. Video coding systems may include block-based, wavelet-based, and/or object-based systems. The systems may employ various template-based coding techniques (e.g., tools), such as Cross Component Linear Model (CCLM) and Local Illumination Compensation (LIC), which, as currently constituted, have a number of drawbacks including burdensome hardware implementations along with individual and combined computation complexities.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
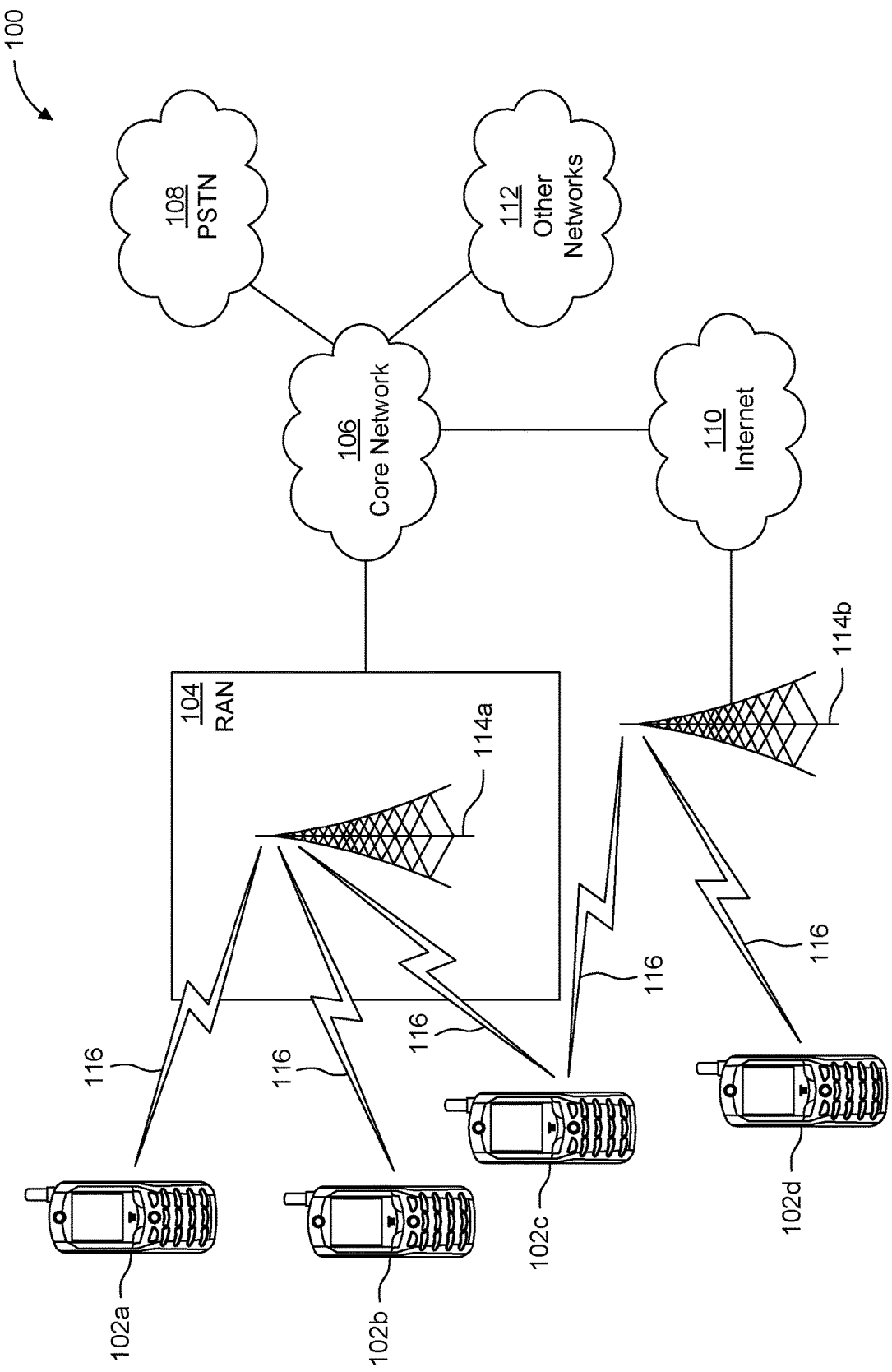
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 4A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
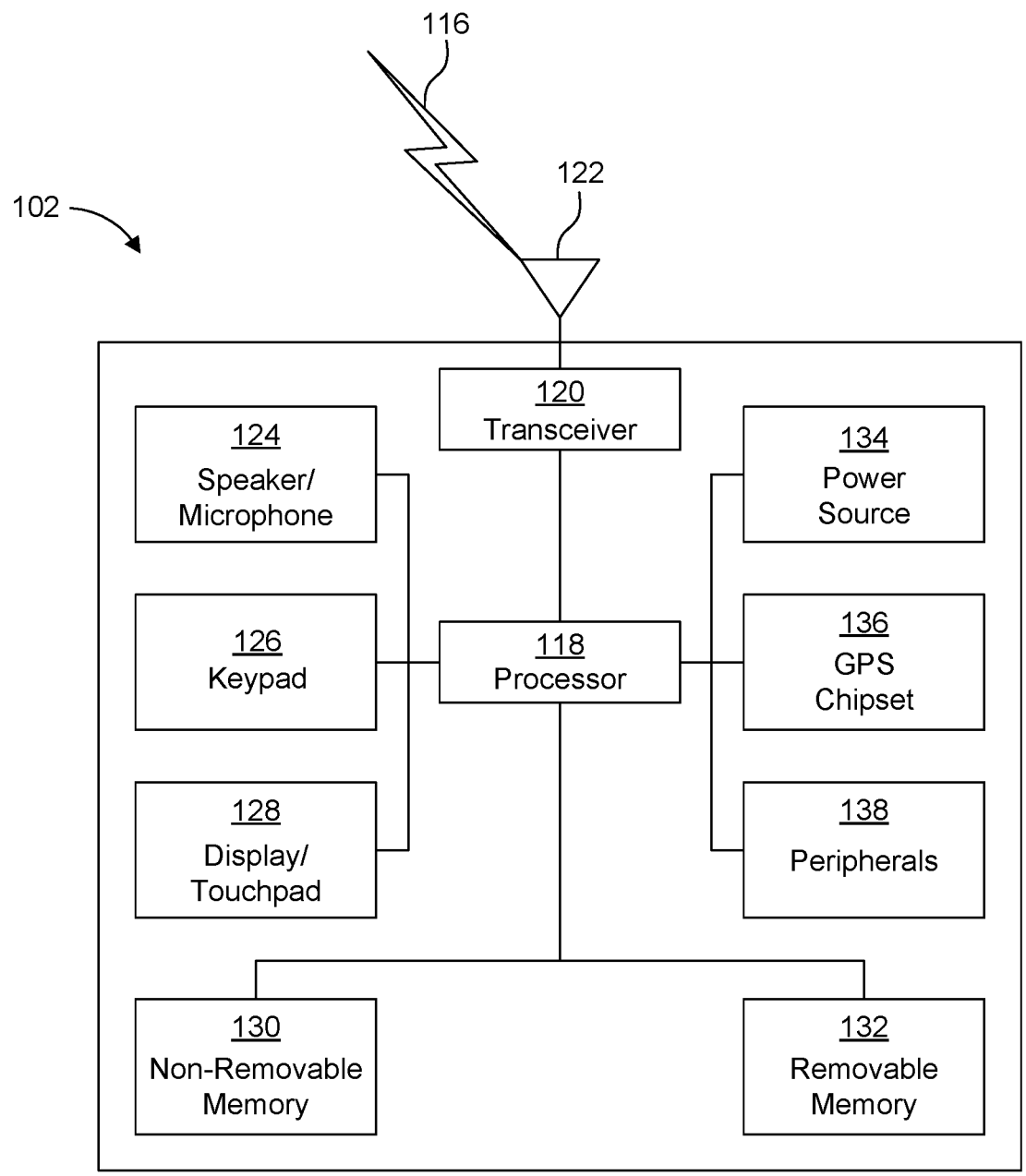
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
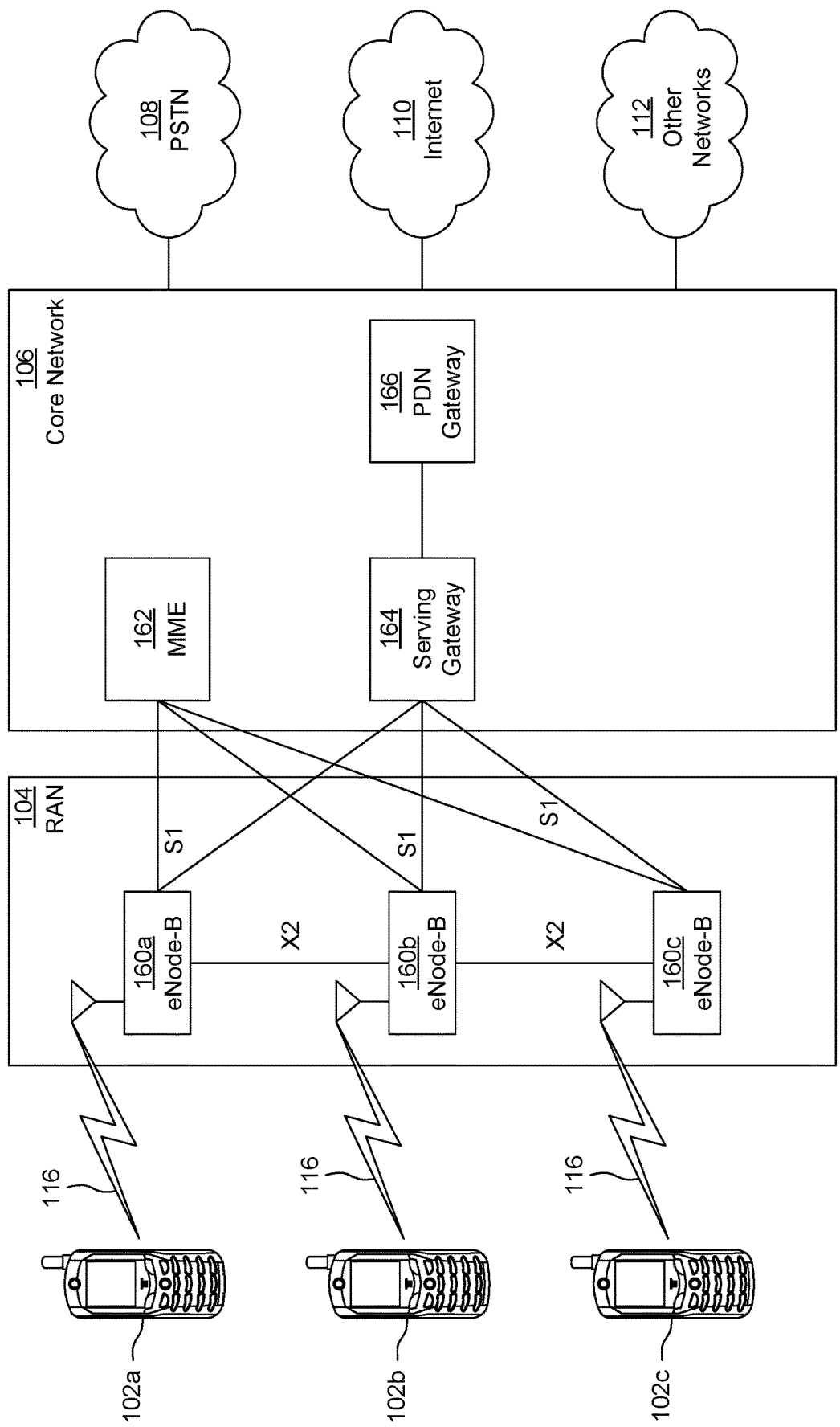
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
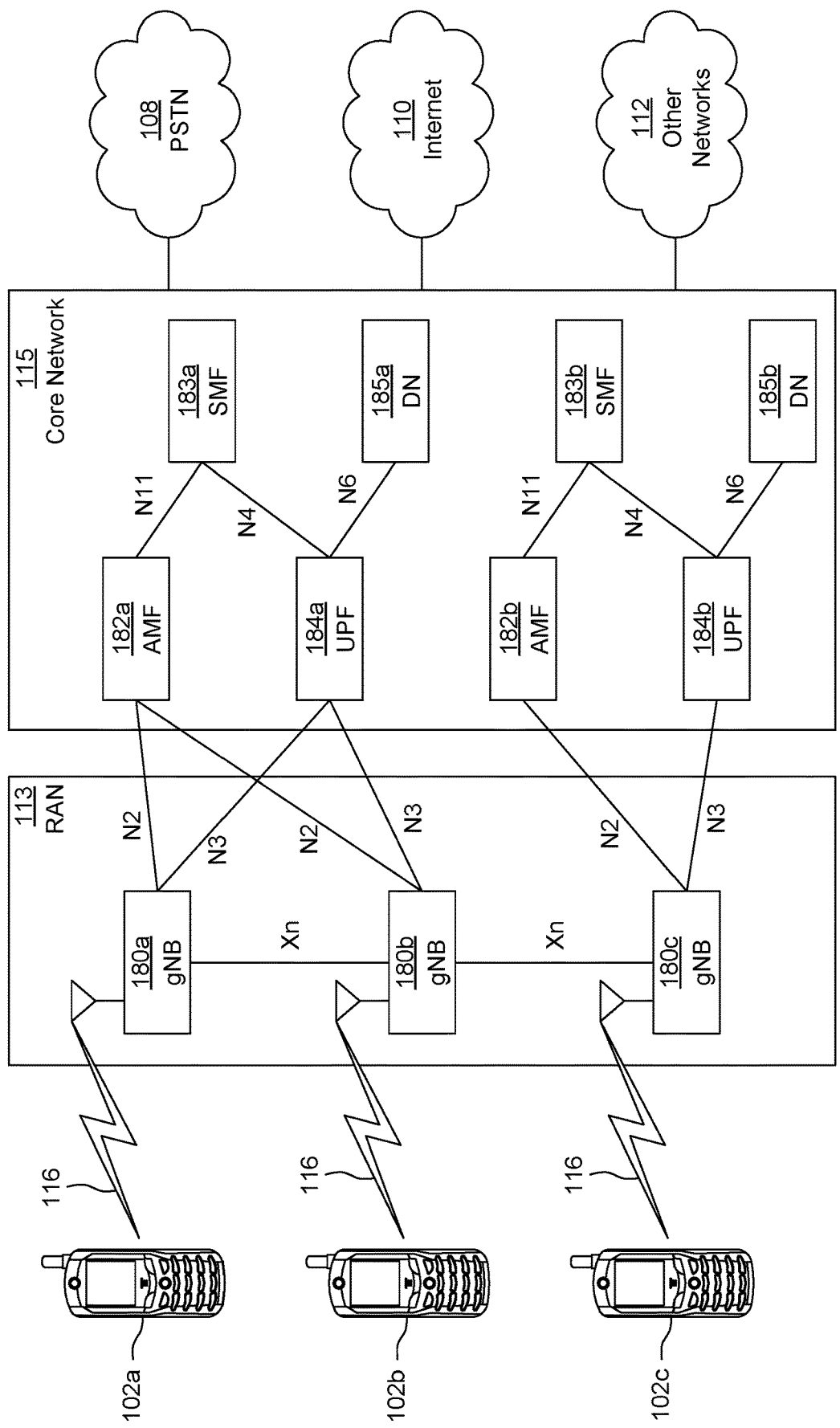
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

Video coding systems may be used to compress digital video signals, which may reduce the storage needs and/or the transmission bandwidth of video signals. Video coding systems may include block-based, wavelet-based, and/or object-based systems. Block-based video coding systems may be based on, use, be in accordance with, comply with, etc. one or more standards, such as MPEG-1/2/4 part 2, H.264/MPEG-4 part 10 AVC, VC-1, High Efficiency Video Coding (HEVC) and/or Versatile Video Coding (VVC), including any reference model associated therewith. Block-based video coding systems may include a block-based hybrid video coding framework.

Representative Architectures/Frameworks

Figure 2:
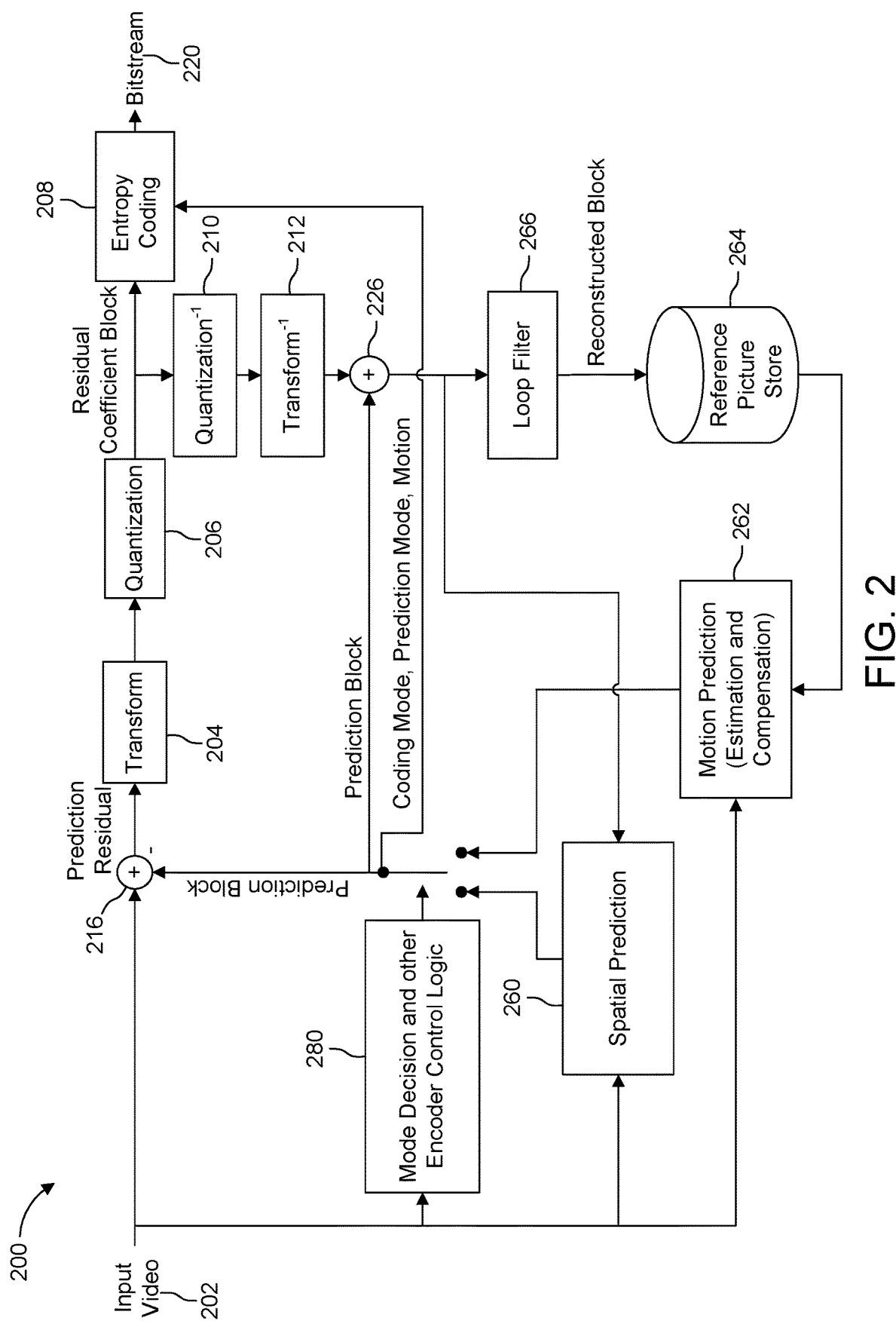
FIG. 2 is a block diagram illustrating an example block-based video encoder.

FIG. 2 is block diagram illustrating an example block-based hybrid video coding framework 200 for an encoder. The encoder, and hence, the example block-based hybrid video coding framework 200 may be implemented in a device having a processor communicatively coupled with memory. The memory may include instructions executable by the processor, including instructions for carrying out any of various embodiments (e.g., representative procedures) disclosed herein. In various embodiments, the device may be, or may be configured as and/or with various elements of a wireless transmit and receive unit (WTRU). Example details of WTRUs and elements thereof are provided herein in FIGS. 1A-1D and accompanying disclosure.

The block-based hybrid video coding framework 200 may include a transform unit 204, a quantization unit 206, an entropy coding unit 208, an inverse quantization unit 210, an inverse transform unit 212, a first summer 216, a second summer 226, a spatial prediction unit 260, a motion/temporal prediction unit 262, a reference picture store 264, filters 266, and a mode decision and other encoder control logic unit 280. The block-based hybrid video coding framework 200 (and encoder) may include additional and/or different elements. Such elements are not illustrated for the sake of brevity and clarity.

Figure 3:
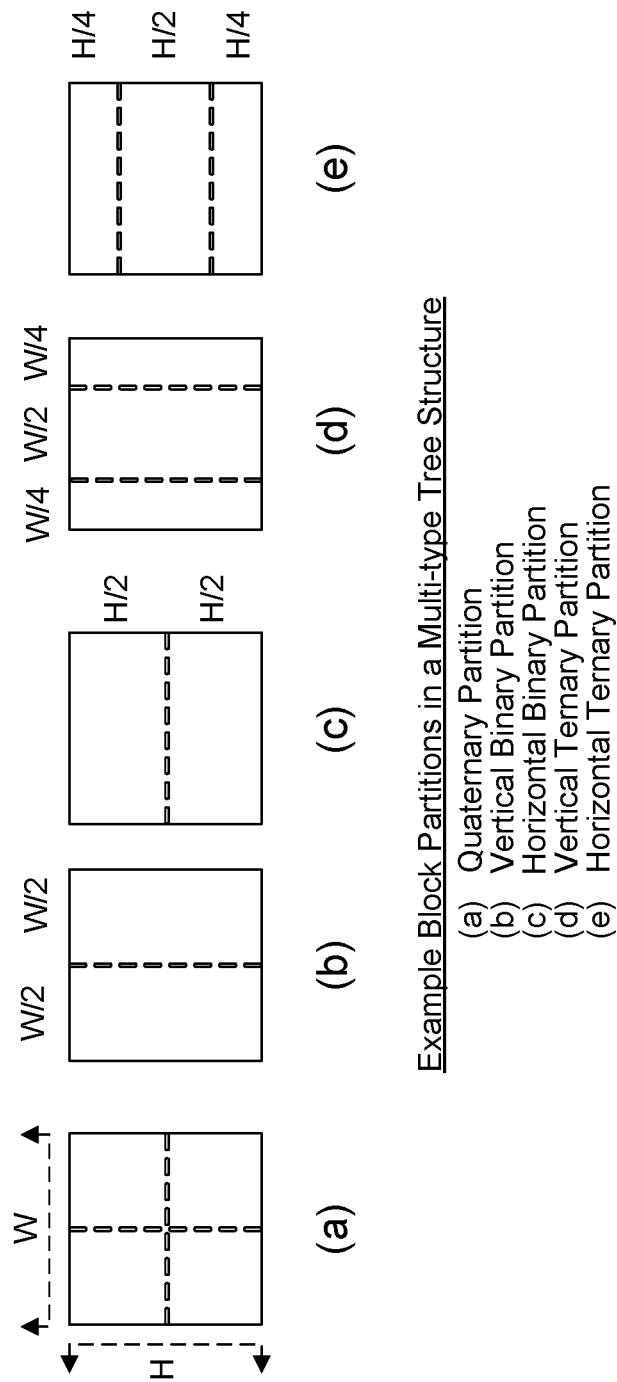
FIG. 3 illustrates examples of quaternary partitioning, horizontal binary partitioning, vertical binary partitioning, horizontal ternary partitioning, and vertical ternary partitioning.

Being block-based, a video signal 202 that undergoes processing by the block-based hybrid video coding framework 200 is carried out on a block-by-block basis. Each block that undergoes processing includes N×M pixels; defining a size of that block ("block size"). Various terms have been used in different block-based video coding systems to refer to the block by its block size. For simplicity of exposition, the terms "coding unit" or its abbreviation "CU" are used herein to refer to a block that undergoes processing by the block-based hybrid video coding framework 200 or any other block-based hybrid video coding framework. Each CU may be partitioned into multiple TUs based on the maximum size of the transform kernel. The CU may include up to 128×128 pixels in accordance with current VVC protocols. It is recognized, however, a CU may include more than 128×128 pixels (i.e., N and/or M may be greater than 128), and a CU may be a partition of a larger set/block of pixels. For instance, a CU may be a partition of a coding tree unit (CTU) of a picture (e.g., a slice of a picture). The CTU may be split into multiple CUs based on one or more partitioning mechanisms, e.g., to adapt to varying local characteristics. The partition mechanisms may include any of quad-tree, binary-tree and ternary-tree structures. An example of a CTU split using quaternary partitioning, horizontal binary partitioning, vertical binary partitioning, horizontal ternary partitioning, and vertical ternary partitioning are shown in FIG. 3 as (a), (b), (c), (d) and (e), respectively. In an embodiment, a multi-type tree structure may be employed in which a CTU is split using a one type of partitioning and the partitions thereof are further partitioned one or more times using the same or a different type of partitioning for each partitioning carried out. As an example, a CTU may be partitioned using a quad-tree structure so as to form quad-tree leaf nodes, and each quad-tree leaf node may be further partitioned using any of a binary tree structure and a ternary tree structure.

Referring again to FIG. 2, a CU may undergo any of spatial prediction and temporal prediction using the spatial prediction unit 260 and the motion/temporal prediction unit 262, respectively. Spatial prediction (e.g., intra prediction) may use pixels from samples of coded neighboring blocks (e.g., reference samples) in the same video picture/slice to predict the current video block. The spatial prediction may reduce spatial redundancy, for example, that may be inherent in the video signal.

The temporal prediction (e.g., inter prediction and/or motion compensated prediction) may use reconstructed pixels from coded video pictures to predict the current video block. The temporal prediction may reduce temporal redundancy, for example, that may be inherent in the video signal. The temporal prediction signal for the CU may be signaled by (e.g., using) one or more motion vectors (MVs). These MVs may indicate an amount and/or direction(s) of motion between the CU and its temporal reference. If multiple reference pictures are supported for a (e.g., each) video block, the video block's reference picture index may be sent. The reference picture index may be used to identify from which reference picture in the reference picture store 264 the temporal prediction signal may derive.

After spatial and/or temporal prediction, the mode decision unit 280 may determine a prediction mode (e.g., the best prediction mode), for example, based on a rate-distortion optimization (RDO). The prediction block may be subtracted from the current video block at the summer 216, and/or the prediction residual may be de-correlated using the transform unit 204 and/or the quantization unit 206. The quantized residual coefficients may be inverse quantized and/or inverse transformed using the inverse quantization unit 210 and the inverse transform unit 212, respectively, so as to form a reconstructed residual. The reconstructed residual may be added back to the prediction block using the summer 226 to form a reconstructed CU. Prior to storing the reconstructed CU in the reference picture store 264, in-loop filtering (e.g., any of a deblocking filter and adaptive loop filters, such as sample adaptive offset (SAO) and adaptive in-loop filter (ALF)) may be applied on the reconstructed CU using the filter unit 266. The reconstructed CU stored in the reference picture store 264 may be used to code video blocks (e.g., future video blocks). Various information, including coding mode (inter or intra), prediction mode information, motion information, and quantized residual coefficients may be passed to the entropy coding unit 208. The entropy coding unit 208 may compress and/or pack such information to form an output video bit-stream 220.

Figure 4:
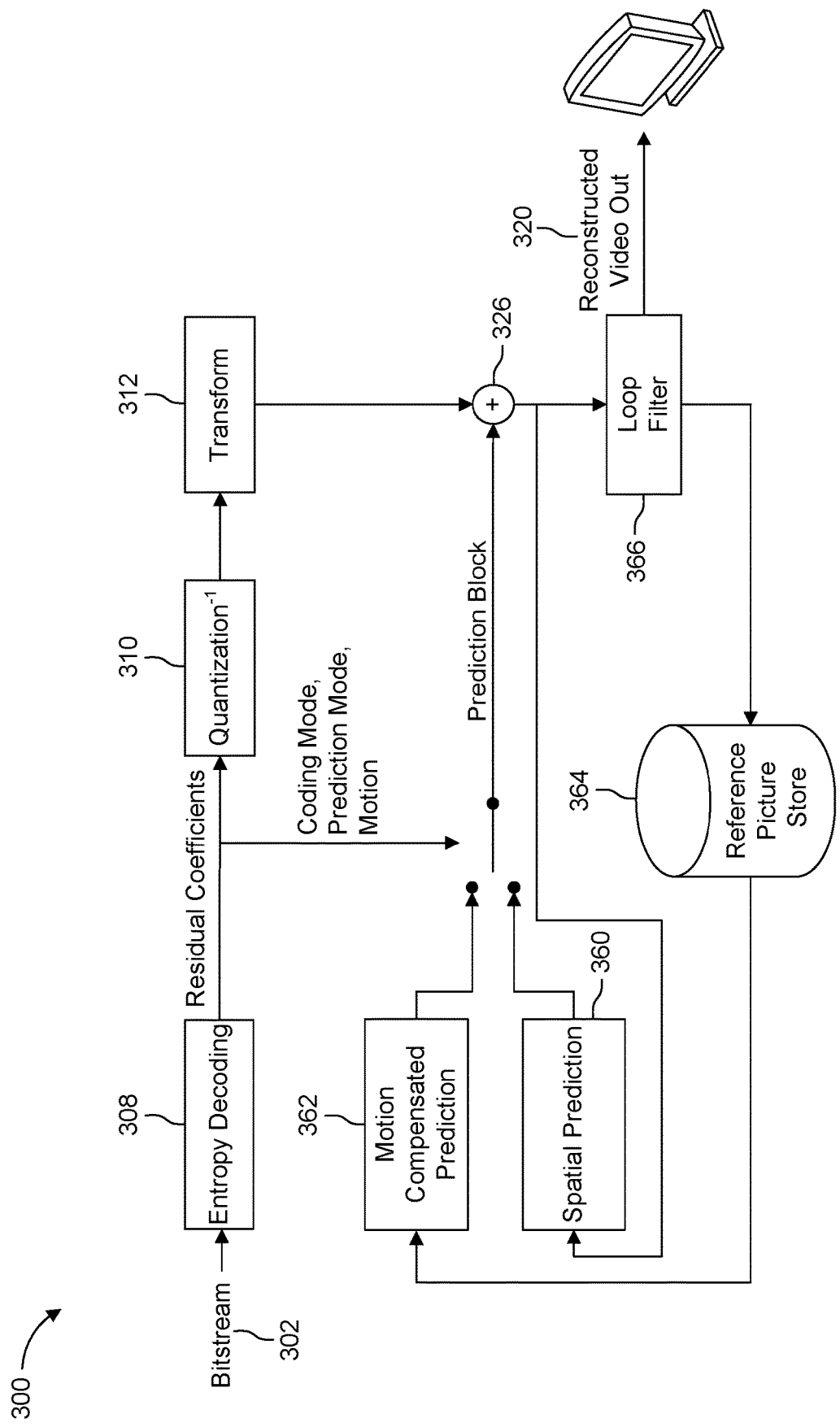
FIG. 4 is a block diagram illustrating an example video decoder.

FIG. 4 is block diagram illustrating an example block-based hybrid video coding framework 300 for a decoder. The decoder, and hence, the example block-based hybrid video coding framework 300 may be implemented in a device having a processor communicatively coupled with memory. The memory may include instructions executable by the processor, including instructions for carrying out any of various embodiments (e.g., representative procedures) disclosed herein. In various embodiments, the device may be, may be configured as and/or configured with various elements of a WTRU.

The block-based hybrid video coding framework 300 may include an entropy decoding unit 308, an inverse quantization unit 310, an inverse transform unit 312, a summer 326, a spatial prediction unit 360, a motion/temporal prediction unit 362, a reference picture store 364 and filters 366. The block-based hybrid video coding framework 300 (and decoder) may include additional and/or different elements. Such elements are not illustrated for the sake of brevity and clarity.

A video bit-stream 302 (e.g., the video bit-stream 220 of FIG. 2) may be unpacked (e.g., first unpacked) and/or entropy decoded at an entropy decoding unit 308. The coding mode and prediction information may be passed to the spatial prediction unit 360 (e.g., if intra coded) and/or to the motion/temporal prediction unit 362 (e.g., if inter coded and/or temporal coded) to form a prediction block. Residual transform coefficients may be passed to the inverse quantization unit 310 and/or the inverse transform unit 312, e.g., to reconstruct the residual block. The prediction block and the residual block may be added together at the summer 326. The reconstructed block may go through in-loop filtering at the filter 366, for example, before the reconstructed block is stored in the reference picture store 364. The reconstructed video 320 in the reference picture store 364 may be sent to drive a display device and/or used to predict video blocks (e.g., future video blocks).

The use of bi-directional motion compensated prediction (MCP) in video codecs may remove temporal redundancies by exploiting temporal correlations between pictures. A bi-prediction signal may be formed by combining two uni-prediction signals using a weight value (e.g., 0.5). In certain videos, illuminance characteristics may change rapidly from one reference picture to another. Thus, prediction techniques may compensate for variations in illuminance over time (e.g., fading transitions) by applying global or local weights and offset values to one or more sample values in the reference pictures.

Other coding tools, such as weighted prediction (WP), may compensate for changes in illuminance over time when performing motion compensation. For example, for each reference picture in each reference picture list (L0 and L1), a set of multiplicative weight and additive offset may be signaled at the slice. The weight and offset may be applied during the MCP stage when the corresponding reference picture may be used. As such, WP coding tools may be employed when illuminance changes linearly from picture to picture and/or when the change in illumination is global at the picture/slice level.

Generalized bi-prediction (GBi) may improve the MCP for bi-prediction mode. In bi-prediction mode, the prediction signal at sample x as given may be calculated by equation ("Eq.") (1):

$$P[x]=w_0*P_0[x+v_0]+w_1*P_1[x+v_1], \quad (1)$$

In Eq. (1), P[x] may denote the resulting prediction signal of a sample x located at a picture position x. $P_i[x+v_i]$ may be the motion-compensated prediction signal of x using the motion vector (MV) $v_i$ for i-th list (e.g. list 0, list 1, etc.). $w_0$ and $w_1$ may be the two weight values shared across (e.g., all) the samples in a block. Based on this equation, a variety of prediction signals may be obtained by adjusting the weight value, $w_0$ and $w_1$. Some configurations of $w_0$ and $w_1$ may imply the same prediction as uni-prediction and bi-prediction. For example, $(w_0, w_1)=(1, 0)$ may be used for uni-prediction with reference list L0. $(w_0, w_1)=(0, 1)$ may be used for uni-prediction with reference list L1. $(w_0, w_1)=(0.5, 0.5)$ may be for the bi-prediction with two reference lists. The weight may be signaled per CU. To reduce the signaling overhead, a constraint may be applied, such as $w_0+w_1=1$, such that one weight may be signaled. As such, Eq. (1) may be further simplified as shown in Eq. (2):

$$P[x]=(1-w_1)*P_0[x+v_0]+w_1*P_1[x+v_1]. \quad (2)$$

To further reduce the weight signaling overhead, $w_1$ may be discretized (e.g., −2/8, 2/8, 3/8, 4/8, 5/8, 6/8, 10/8, etc.). Each weight value may then be indicated by an index value within a (e.g., small) limited range.

Figure 5:
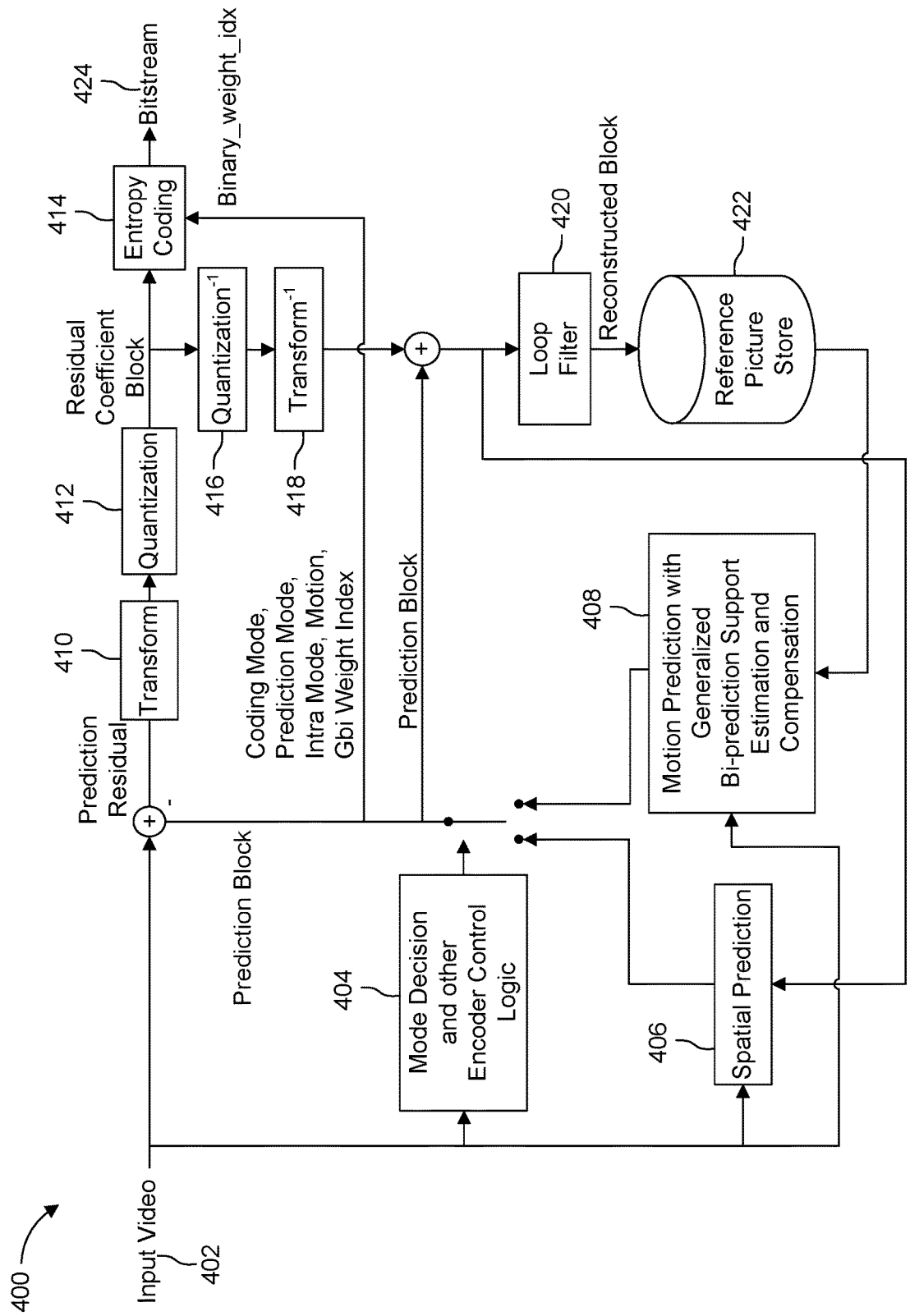
FIG. 5 is a block diagram of an example block-based video encoder with generalized bi-prediction (GBi) support.

FIG. 5 is a block diagram illustrating an example video encoder with GBi support. The encoder may include a mode decision unit 404, spatial prediction unit 406, a motion prediction unit 408, a transform unit 410, a quantization unit 412, an inverse quantization unit 416, an inverse transform unit 418, a loop filter 420, a reference picture store 422 and an entropy coding unit 414. Some or all of the encoder's units or components (e.g., the spatial prediction unit 406) may be the same as, or similar to, those described in connection with FIG. 2. In addition, the spatial prediction unit 406 and the motion prediction unit 408 may be pixel-domain prediction units. Thus, an input video bit-stream 402 may be processed in a similar manner as the input video bit-stream 202, though the motion prediction unit 408 may further include GBi support. As such, the motion prediction unit 408 may combine two separate prediction signals in a weighted-averaging manner. Further, the selected weight index may be signaled in the input video bitstream 402.

Figure 6:
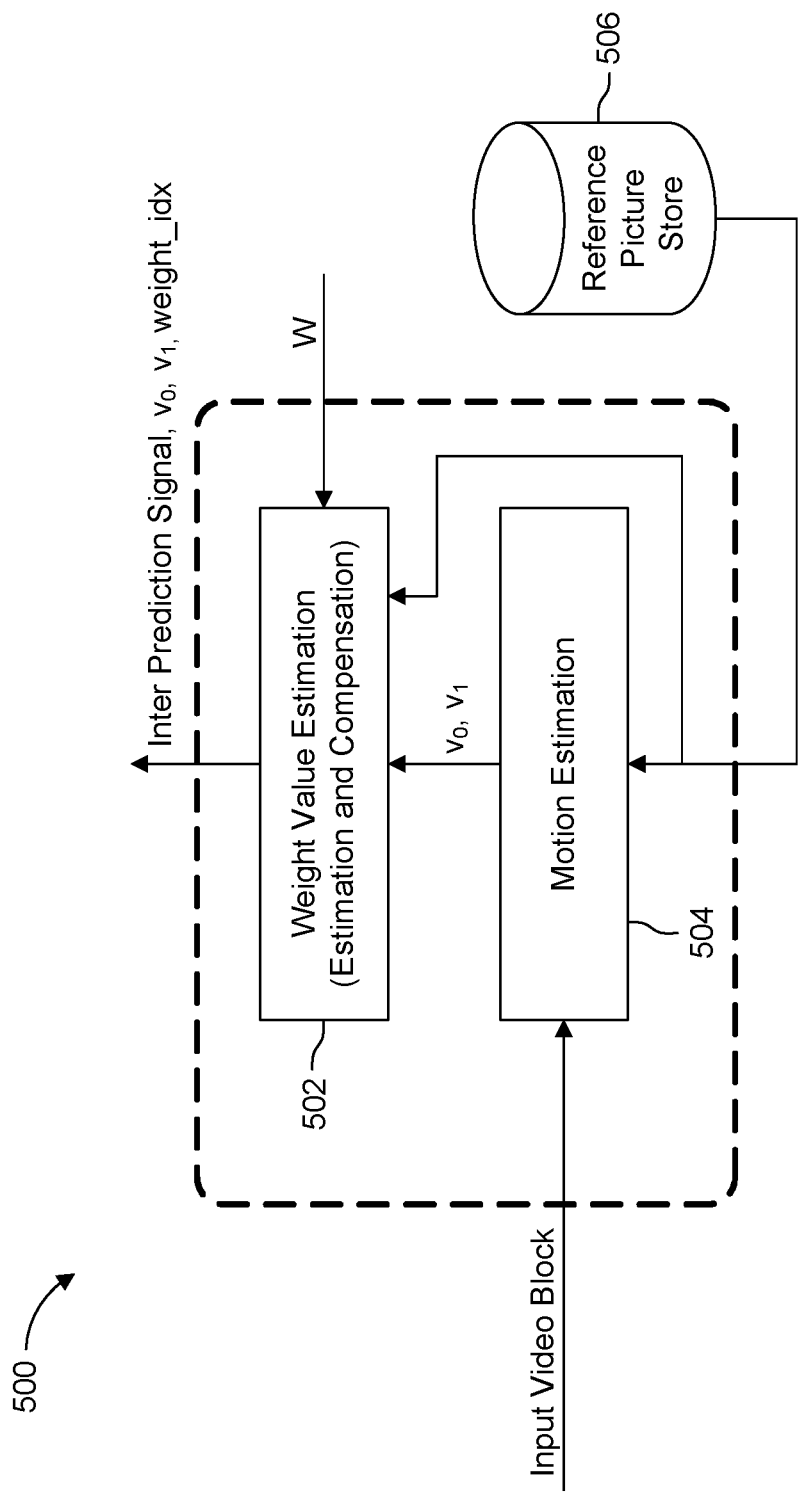
FIG. 6 is a block diagram illustrating an example GBi unit for an encoder.

FIG. 6 is a block diagram illustrating a GBi estimation unit 500 that may be employed in a motion prediction unit of an encoder, such as the motion prediction unit 408. The GBi estimation unit 500 may include a weight value estimation unit 502 and a motion estimation unit 504. As such, the GBi estimation unit 500 may utilize a two-step process to generate inter prediction signal, such as a final inter prediction signal. The motion estimation unit 504 may perform motion estimation using reference picture(s) received from a reference picture store 506 and by searching two optimal motion vectors (MVs) pointing to (e.g., two) reference blocks. The weight value estimation unit 502 may search for the optimal weight index to minimize the weighted bi-prediction error between the current video block and bi-prediction signal. The prediction signal of the generalized bi-prediction may be computed as a weighted average of the two prediction blocks.

Figure 7:
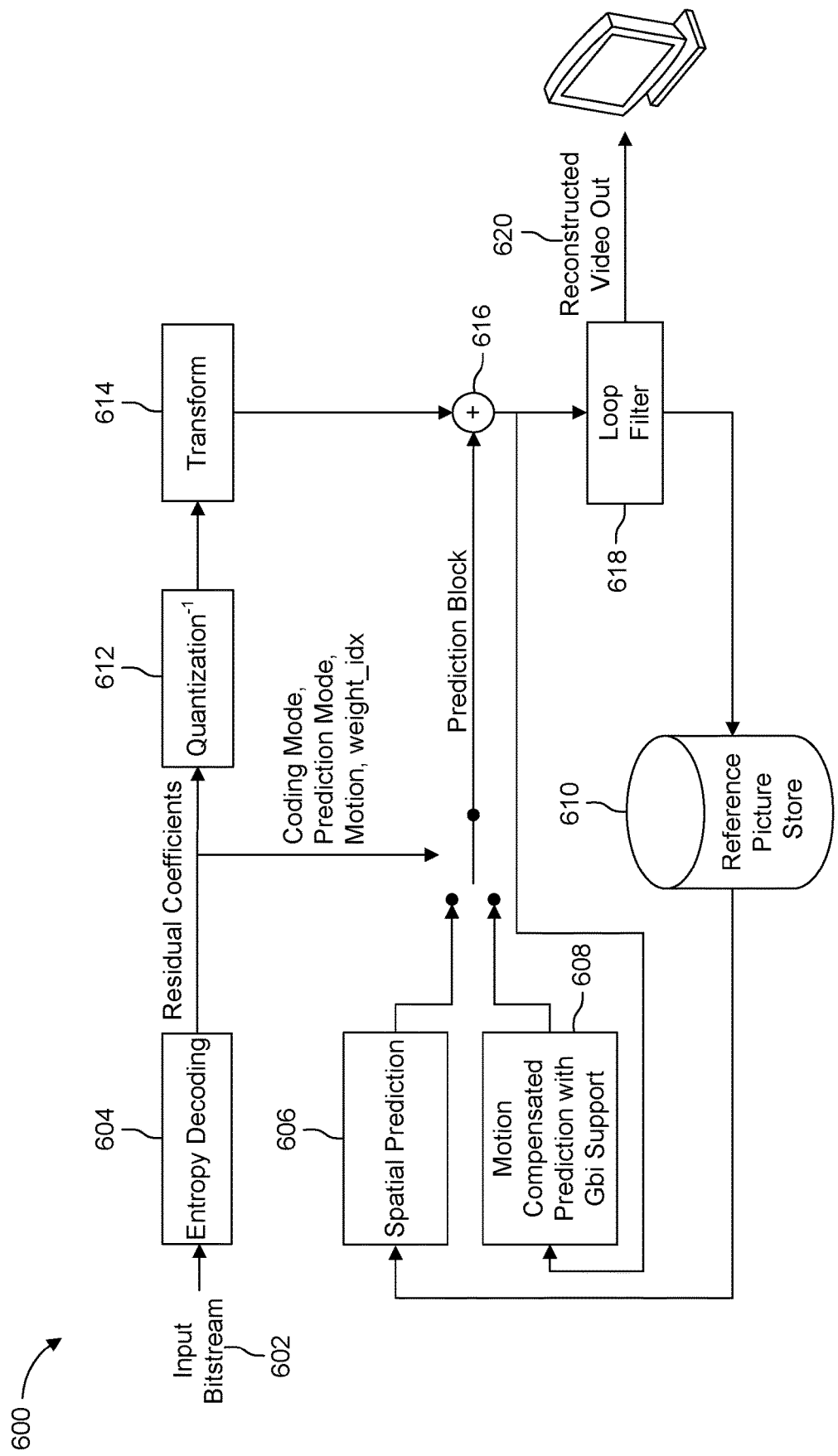
FIG. 7 is a block diagram illustrating an example block-based video decoder with GBi support.

FIG. 7 is a block diagram illustrating an example video decoder that may decode a bit-stream from an encoder that supports GBi, such as the encoder described in connection with FIG. 4. As shown in FIG. 6, the decoder may include an entropy decoder 604, a spatial prediction unit 606, a motion prediction unit 608, a reference picture store 610, an inverse quantization unit 612, an inverse transform unit 614 and a loop filter unit 618. Some or all of the decoder's units may be the same as, or similar to, those described in connection with FIG. 2. The motion prediction unit 608 may be configured for GBi support. As such, the coding mode and prediction information may be used to derive a prediction signal using either spatial prediction or MCP with GBi support. For GBi, the block motion information and weight value (e.g., in the form of an index indicating a weight value) may be received and decoded to generate the prediction block.

Figure 8:
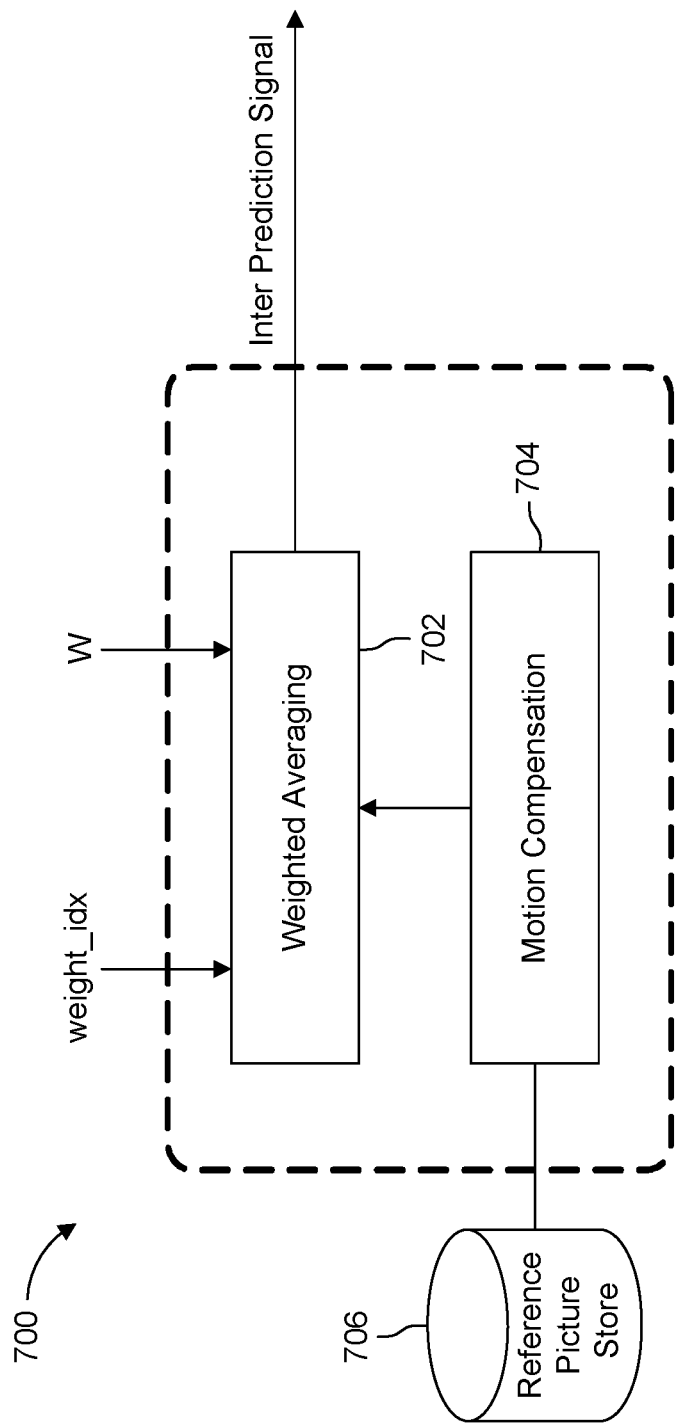
FIG. 8 is a block diagram illustrating an example GBi unit for a decoder.

FIG. 8 is a block diagram illustrating a GBi prediction unit 700 that may be employed in a motion prediction unit of a decoder, such as the motion prediction unit 608. The GBi prediction unit 700 may include a weighted averaging unit 702 and a motion compensation unit 704, which may receive one or more references pictures from a reference picture store 706. The GBi prediction unit 700 may use the block motion information and weight value to compute a prediction signal of GBi as a weighted average of (e.g., two) motion compensated prediction blocks.

There may be various types of motions within a particular video, such as zoom in/out, rotation, perspective motions and other irregular motions. A translational motion model and/or an affine motion model may be applied for MCP in connection with one or more of the various types of motions. The affine motion model may be four-parameter and/or six-parameter. A first flag for (e.g., each) inter coded CU may be signaled to indicate whether the translational motion model or the affine motion model is applied for inter prediction. If the affine motion model is applied, a second flag may be sent to indicate whether the model is four-parameter or six-parameter.

The four-parameter affine motion model may include two parameters for translation movement in the horizontal and vertical directions, one parameter for a zoom motion in the horizontal and vertical directions and/or one parameter for a rotation motion in the horizontal and vertical directions. A horizontal zoom parameter may be equal to a vertical zoom parameter. A horizontal rotation parameter may be equal to a vertical rotation parameter. The four-parameter affine motion model may be coded (e.g., in a VVC test model (VTM)) using two motion vectors at two control point positions defined at the top-left and top right corners of a (e.g., current) CU.

Various template-based coding techniques (e.g., tools) may be carried out by the disclosed block-based hybrid video coding frameworks (e.g., frameworks 200, 300, 400 and/or 600), encoders and/or decoders. Such template-based coding techniques employ respective models/methods; each of which is characterized by one or more parameters. Currently, there is no unified model/method among the template-based coding techniques for parameter estimation, including the template-based coding techniques that utilize the same or like-type parameters. As an example, consider the current template-based coding techniques of Cross Component Linear Model (CCLM) and Local Illumination Compensation (LIC). Although CCLM assumes a linear correlation between luma and chroma components in a coding block and LIC assumes a linear correlation between luma samples of a reference frame and a current frame, they employ different models/methods for parameter estimation.

Figure 9:
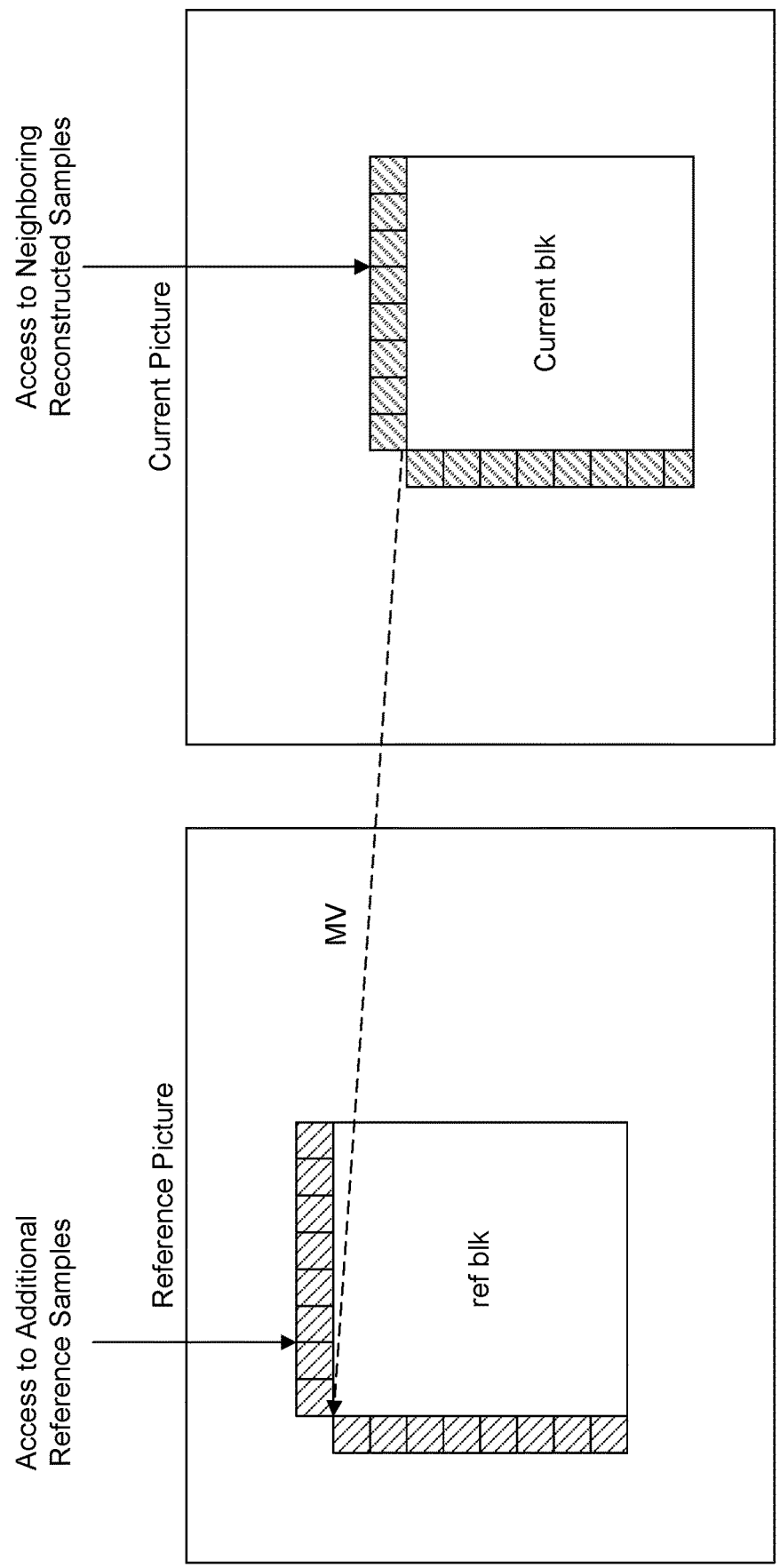
FIG. 9 is a block diagram illustrating a set of frames/pictures upon which Local Illumination Compensation (LIC) may be carried out.

FIG. 9 is a block diagram 900 illustrating a set of frames/pictures upon which LIC may be carried out. LIC is an inter coding tool that may be used to compensate for illumination differences between (i) samples from a reference frame (prediction) and (ii) samples from a current frame. Prediction (e.g. using traditional prediction techniques) may fail, for example, when cameras capture a scene having illumination difference between frames. Variation in lighting can occur due to fade-out, fade-in, dissolve scenario(s) which have differences in illumination between the current and reference frames. LIC may access reconstructed samples neighboring a CU in the current frame and corresponding samples in the reference frame to compute LIC parameters for the illumination compensation model. The illumination compensation model may be applied to current motion compensated pixels to compensate for illumination differences.

For a current CU, the neighboring reconstructed samples in the rows and columns on top and to the left of both of the CU and a reference block of the reference frame are used as input to determine a linear model characterized by scaling factor $\alpha$ and offset $\beta$. An adaptive down-sampling technique from the corresponding reference samples of the neighboring blocks of the current CU block is employed to generate the local illumination compensation parameters.

LIC can be switched on and off adaptively for each inter coded CU. Mean removed sum of absolute difference (MR-SAD) and mean removed sum of absolute Hadamard transformed difference (MR-SATD) are obtained instead of SAD and SATD for integer pel motion search and fractional pel motion search respectively. When each CU is coded in a 2N×2N merge mode, a LIC flag is copied from neighboring blocks selected as the merge candidate in a way similar to motion information copy in merge mode. Otherwise, the LIC flag is signaled for the CU to indicate whether LIC applies or not.

When LIC applies, a least square error method is used to determine the scaling factor $\alpha$ and offset $\beta$ of a linear model. The goal is to minimize the error between reconstructed neighboring samples and its corresponding adjusted prediction samples, where the adjusted prediction samples are generated with a linear model applied to the prediction samples as Eq. (3).

$$P_L'(x,y) = \alpha \cdot P_L(x,y) + \beta \qquad (3)$$

where, $P_L(x, y)$ represents a prediction of the neighboring luma samples without adjustment, and $P_L'(x, y)$ represents an adjusted prediction sample. The parameters $\alpha$ and $\beta$ are derived by minimizing a regression error between the reconstructed neighboring luma samples of a coding block in current frame and the adjusted prediction samples.

When LIC and GBI tools are used together (e.g., in BMS-2.1rel (VTM configuration) the gains of both tools are cumulative. For bi-predicted blocks, LIC parameters (weight and offset) are estimated for each prediction direction separately. The estimated LIC parameters are applied to each prediction signal separately, and then the two LIC modified prediction signals are combined to form the bi-prediction signal. In other words, two individual LIC processes are used for bi-predicted CUs.

As noted above, when LIC applies for a CU, a least square error method is used to determine the scaling factor $\alpha$ and offset $\beta$. The parameters $\alpha$ and $\beta$ are derived by minimizing the regression error between the current and the reference luma samples as follows.

Given a set of n points $(X_i, Y_i)$ the goal is to find the best fit-line $$\hat{Y}_t = \alpha \cdot X_t + \beta. \tag{4}$$

such that, the error $\Sigma(Y_i - \hat{Y}_t)^2$ is minimized. This requires solving for the least square model, which is a computationally complex operation.

Figure 10:
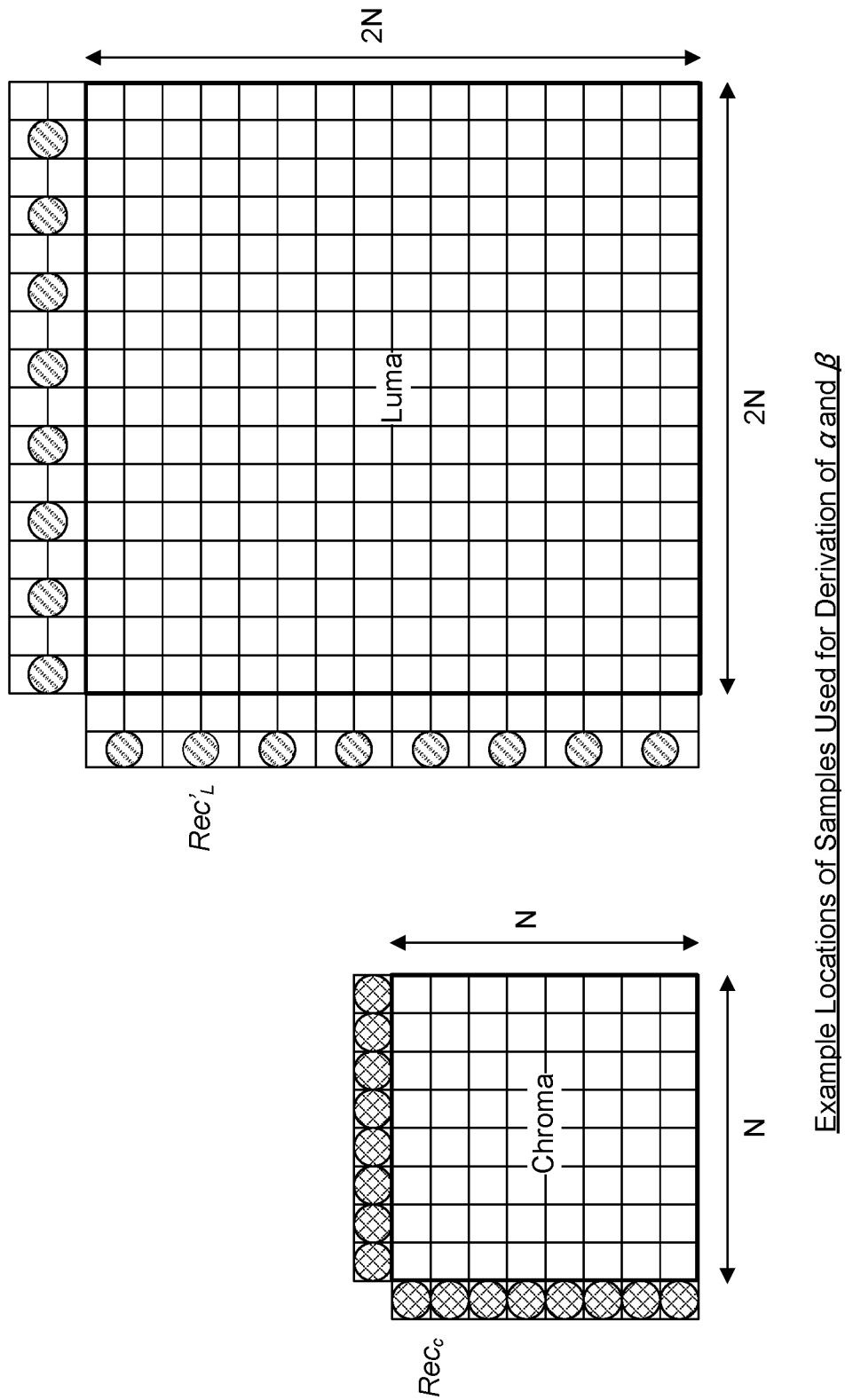
FIG. 10 illustrates example locations of left and above causal samples for Cross Component Linear Model (CCLM)

Under CCLM, a chroma component in a block can predicted from a luma component with a linear model. An additional rate distortion (RD) cost check for the chroma component is added for selecting a chroma intra prediction mode. When the LM mode is used, the chroma component is predicted from reconstructed luma samples as:

$$Pred_c(x,y) = \alpha \cdot Rec_L'(x,y) + \beta \tag{5}$$

where, $Pred_c(x, y)$ represents a prediction of the chroma samples and $Rec_L(x, y)$ represents reconstructed luma sample values. $Rec_L'(x, y)$ may be down-sampled from the reconstructed luma samples in a coding block for non-4:4:4 chroma format to align the prediction sample from luma component with the chroma component. The parameters $\alpha$ and $\beta$ determine the model used for prediction. In some implementations, a least square minimization method is used to determine the optimal parameters. The parameters $\alpha$ and $\beta$ are derived by minimizing the regression error between the neighboring reconstructed luma and chroma samples around the current block as follows:

$$\alpha = \frac{N \cdot \sum(L(n) \cdot C(n)) - \sum L(n) \cdot \sum C(n)}{N \cdot \sum(L(n) \cdot L(n)) - \sum L(n) \cdot \sum L(n)} \tag{6}$$

$$\beta = \frac{\sum C(n) - \alpha \cdot \sum L(n)}{N}$$

where L(n) represents down-sampled top and left neighboring reconstructed luma samples, C(n) represents top and left neighboring reconstructed chroma samples, and N is equal to twice the minimum of width and height of the current chroma coding block. For a coding block with a square shape, the Eq. (6) are applied directly. For a non-square coding block, the neighbouring samples of the longer boundary are first subsampled to have the same number of samples as for the shorter boundary. FIG. 10 shows example locations of left and above causal samples and the samples of the current block for the CCLM mode.

The regression error minimization computation (Eq. (6)) is performed as part of the decoding process to derive the $\alpha$ and $\beta$ values, not just as an encoder search operation. This means no syntax elements are needed to signal the $\alpha$ and $\beta$ values.

Figure 11:
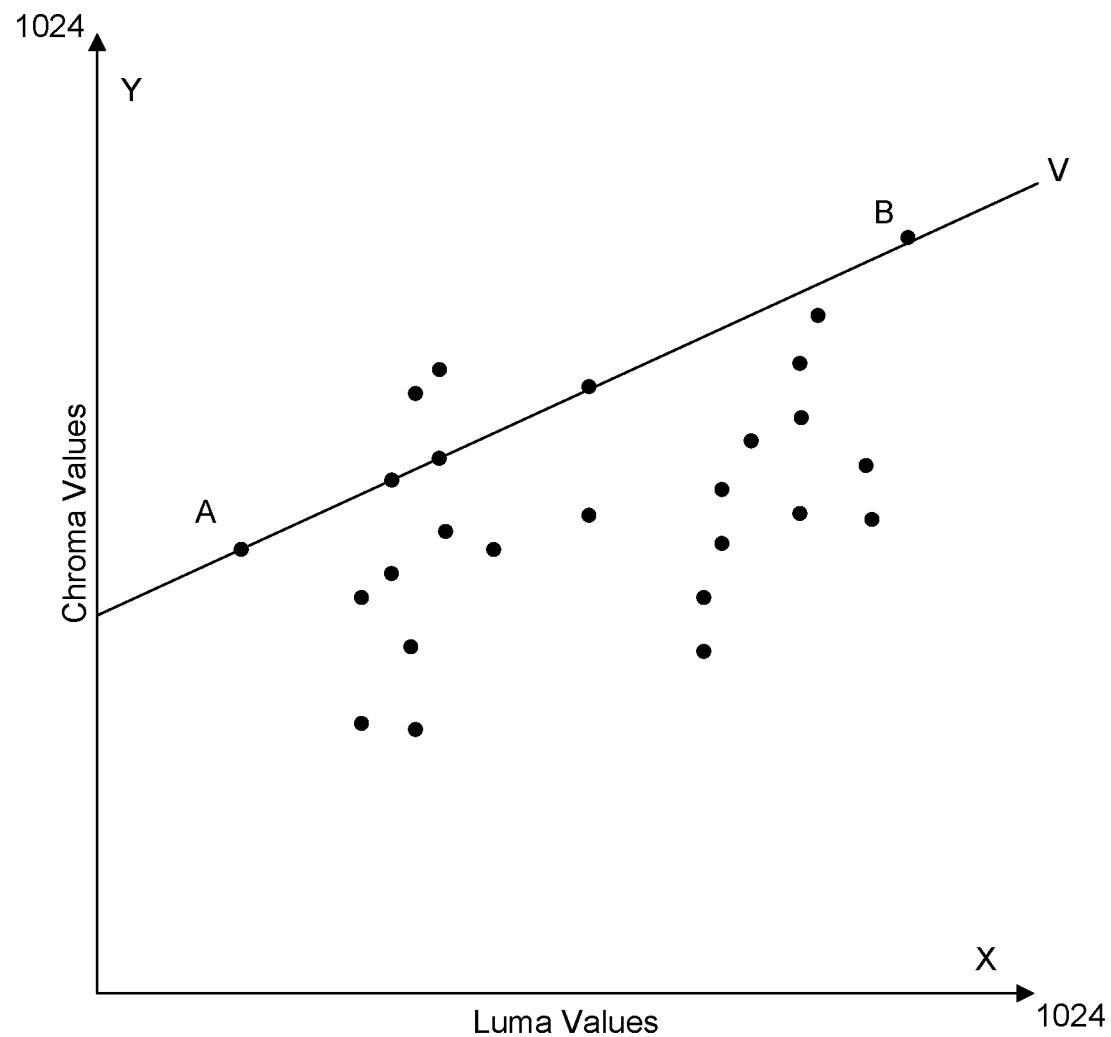
FIG. 11 illustrates an example CCLM straight line estimation model for deriving linear model parameters.

In an implementation, a straight-line estimation is employed for CCLM (i.e., instead of a least square (LS) algorithm). An example of a straight-line estimation for deriving linear model parameters $\alpha$ and $\beta$ is shown in FIG. 11.

The linear model parameters $\alpha$ and $\beta$ are obtained using minimum and maximum luma and chroma sample value pairs inside a set of neighboring samples (e.g., as shown) and the following equation:

$$\alpha = \frac{y_B - y_A}{x_B - x_A}, \beta = y_A - \alpha \cdot x_A \tag{7}$$

where, values along x axis, $x_A$ and $x_B$ are the luma values at points A and B. Values along y axis, $y_A$ and $y_B$ are the chroma values at points A and B, respectively.

The conventional straight-line estimation version of CCLM ("CCLM-SLE") uses two look-up tables (LUTs), Eq. (8) and an instantiation of pseudo code A (below) to compute a most significant bit (MSB) and a least significant bit (LSB).

$$MSB = \text{floor}\left(\frac{2^n}{\textit{diff}}\right) \tag{8}$$

$$LSB = \left\{\text{floor}\left(\frac{2^{2n}}{\textit{diff}}\right) - 2^n \times MSB\right\}$$

In the conventional straight-line estimation version of CCLM-SLE, both of MSB and LSB LUTs have 512 entries; each of which is 16 bits (hence, the MSB and LSB are calculated using 1024 entries at a calculation precision of 16 bits (i.e., n=16). The MSB and LSB LUTs are used to compute the model parameters $\alpha$ and $\beta$ as follows. The minimum and maximum values of the luma and chroma samples are determined. The parameters $\alpha$ and $\beta$ are computed in accordance with the pseudo code A below:

```
shift = (BitDepthC > 8) ? BitDepthC - 9 : 0
add = shift ? 1 << (shift - 1) : 0
diff = (MaxLuma - MinLuma + add) >> shift
k = 16
If (diff > 0)
    div = ((ChromaForMaxLuma - ChromaForMinLuma) * (LSB) >> 16
    α = (((ChromaForMaxLuma - ChromaForMinLuma) * (MSB) +
div + add) >> shift)
Otherwise,
    α = 0
β = ChromaForMinLuma - ((a * MinLuma) >> k)
        Pseudo Code A - Conventional CCLM-SLE
``` where, BitDepthC is the chroma bit-depth, MaxLuma is the maximum value of the down-sampled top and left neighboring luma samples, MinLuma is the minimum value of the down-sampled top and left neighboring luma samples, ChromaForMaxLuma is chosen from top and left neighboring reconstructed chroma samples and correspond to the chroma for the maximum value of luma, ChromaForMinLuma is chosen from top and left neighboring reconstructed chroma samples and correspond to the chroma for the minimum value of luma samples.

According to the pseudo code above, the parameter BitDepthC restricts the chroma bit-depth to 9 bits. The slope $\alpha$ and the offset $\beta$ parameters are calculated in 16 bits precision using values from the MSB and LSB LUTs. An error generated from using the MSB is mitigated by the LSB computation, namely, the parameter div is added to account for the error introduced due to integer based operation in computing the slope and offset measures.

There are two drawbacks of CCLM-SLE. First, hardware implementation is a costly due to having to tie up 2 Kbytes of memory to store the LUTs that are used to calculate the MSB and LSB during computation of the CCLM-SLE parameters. Second, errors arise in the computation of the CCLM-SLE parameters because the CCLM-SLE uses the set of minimum and maximum values within the set of neighboring luma samples and the minimum and maximum are error prone due to the presence of outliers.

In addition to the drawbacks noted above with respect to both LIC and CCLM, additional burdens on hardware implementations due to the estimation methods for LIC and CCLM being different notwithstanding that both estimate linear model parameters.

Overview

As would be appreciated by a person of skill in the art based on the teachings herein, encompassed within the embodiments described herein, without limitation, are procedures, methods, architectures, apparatuses, systems, devices, and computer program products directed to an improved linear model estimation for template-based video coding are provided. Included therein is an apparatus (e.g., implementing any of an encoder or decoder) that may be configured to predict chroma (or luma) components of a current coding block using a straight-line estimation model/method employed by template-based coding techniques (e.g., tools), such as CCLM, LIC, etc., in which model parameters α (e.g., slope) and β (e.g., intercept) are computed using a single look-up table ("LUT") and at a precision no greater than 16 bits.

Included among the procedures, methods, architectures, apparatuses, systems, devices, and computer program products is a method that may be implemented in any of an encoder and a decoder and that may include determining minimum and maximum values of luma samples neighboring a coding block; determining minimum and maximum values of chroma samples neighboring the coding block and corresponding to the minimum and maximum values of the luma samples, respectively; determining (e.g., computing) a first linear model parameter (e.g., a slope) of a template-based video coding technique (i) as a function of a single LUT and the minimum and maximum values of the chroma samples and (ii) at a precision no greater than 16 bits; determining (e.g., computing) a second linear model parameter (e.g., an intercept) of the template-based video coding technique (i) as a function of the minimum value of the chroma samples, the minimum value of the luma samples and the first linear model parameter and (ii) at a precision no greater than 16 bits; and predicting chroma samples of the coding block based on the first linear model parameter, the second linear model parameter and reconstructed luma samples of the coding block.

In an embodiment, the single LUT may exclude values for determining a least significant bit. Alternatively, the single LUT may include values for determining a least significant bit only (e.g., only an LSB LUT) or values for determining a most significant bit only (e.g., only an MSB LUT).

In an embodiment, the minimum and maximum values of the luma and chroma may correspond to respective templates. In an embodiment, the minimum and maximum values of the luma and chroma may correspond to the respective templates but might not include all samples of such templates.

In an embodiment, the method may include any of pruning one or more samples of the luma template to obtain the luma samples used for (e.g., prior to) determining the minimum and maximum values of the luma samples and pruning one or more samples of the luma template to obtain the luma samples used for (e.g., prior to) determining the minimum and maximum values of the luma samples (1704). In an embodiment, the pruning of the luma/chroma samples may include outlier removal or otherwise excluding one or more samples of the luma/chroma template based on statistical methods. In an embodiment, the luma and chroma samples belong to a point distribution having a single region or to one of a plurality of regions of the point distribution.

In an embodiment, the method may determine minimum and maximum values of chroma samples neighboring the coding block and then may determine minimum and maximum values of luma samples neighboring the coding block that correspond to the minimum and maximum values of the chroma samples, respectively. In an embodiment, the luma components instead of the chroma components of a current coding block may be predicted by carrying out the method with the terms "chroma" and "luma" interchanged.

Included among the procedures, methods, architectures, apparatuses, systems, devices, and computer program products is a method that may be implemented in any of an encoder and a decoder and that may include segregating luma and chroma samples neighboring a coding block into a plurality of samples clusters based on one or more thresholds; and on condition that the segregation of first and second samples clusters satisfies a segregation metric: determining minimum and maximum values of the luma samples of a first samples cluster; determining minimum and maximum values of the chroma samples of the first samples cluster that correspond to the minimum and maximum values of the luma samples of the first samples cluster, respectively; determining (e.g., computing) a first linear model parameter of a first template-based video coding technique (i) as a function of the minimum and maximum values of the chroma samples of the first samples cluster and (ii) at a first precision; determining (e.g., computing) a second linear model parameter of the first template-based video coding technique (i) as a function of the minimum value of the chroma samples of the first samples cluster, the minimum value of the luma samples of the first samples cluster and the first linear model parameter of the first template-based video coding technique and (ii) at the first precision; determining minimum and maximum values of the luma samples of a second samples cluster; determining minimum and maximum values of the chroma samples of the second samples cluster that correspond to the minimum and maximum values of the luma samples of the second samples cluster, respectively; determining (e.g., computing) a first linear model parameter of a second template-based video coding technique (i) as a function of the minimum and maximum values of the chroma samples of the second samples cluster and (ii) at a second precision; determining (e.g., computing) computing a second linear model parameter of the second template-based video coding technique (i) as a function of the minimum value of the chroma samples of the second samples cluster, the minimum value of the luma samples of the second samples cluster and the first linear model parameter of the second template-based video coding technique and (ii) at the second precision; and predicting a chroma samples of the coding block based on the first and second linear model parameters of the first and second template-based video coding techniques and reconstructed luma samples of the coding block.

In an embodiment, at least one of the thresholds may be based on an average of the luma samples neighboring the coding block. In an embodiment, the first and second linear model parameters of each of the first and second template-based video coding technique are slope and intercept.

In an embodiment, the method may include recombining two clusters and proceeding with prediction using a single straight-line estimation model/method employed by a template-based coding technique on condition that the segregation of any two clusters does not satisfy the segregation metric.

In an embodiment, the first linear model parameter of the first template-based video coding technique may be computed as a function of the minimum and maximum values of the chroma samples of the first samples cluster and one or more first LUTs. In an embodiment, the first linear model parameter of the second template-based video coding technique is computed as a function of the minimum and maximum values of the chroma samples of the second samples cluster and one or more LUTs. In an embodiment, any of the LUTs may exclude values for determining a least significant bit. In an embodiment, any of the LUTs may include values for determining a least significant bit only. In an embodiment, any of the LUTs may include values for determining a most significant bit only.

In an embodiment, the first precision may be based on a statistical description (e.g., distribution) of the samples within the first samples cluster. In an embodiment, the second precision may be based on a statistical description (e.g., distribution) of the samples within the second samples cluster. In an embodiment, the first linear model parameter of the first template-based video coding technique may be computed at a precision no greater than 16 bits. In an embodiment, the second linear model parameter of the first template-based video coding technique may be computed at a precision no greater than 16 bits. In an embodiment, the first linear model parameter of the second template-based video coding technique may be computed at a precision no greater than 16 bits. In an embodiment, the second linear model parameter of the first template-based video coding technique may be computed at a precision no greater than 16 bits.

In an embodiment, the minimum and maximum values of the luma and chroma may correspond to respective templates. In an embodiment, the minimum and maximum values of the luma and chroma may correspond to the respective templates but might not include all samples of such templates. In an embodiment, the method may include pruning one or more samples of the luma and/or chroma templates prior to segregation.

In an embodiment, the method may include pruning one or more luma/chroma samples of the first samples cluster prior to determining minimum and maximum values of the luma/chroma samples of the first samples cluster and/or pruning one or more luma/chroma samples of the second samples cluster prior to determining minimum and maximum values of the luma/chroma samples of the second samples cluster. In an embodiment, the pruning of the luma/chroma samples may include outlier removal or otherwise excluding one or more samples of the luma/chroma template based on statistical methods, e.g., based on descriptive statistics (e.g., as described herein).

In an embodiment, the method may include determining minimum and maximum values of chroma samples of the first (and/or second) samples cluster and then may determine minimum and maximum values of luma samples of the first (and/or second) samples cluster that correspond to the minimum and maximum values of the chroma samples, respectively. In an embodiment, the luma components instead of the chroma components of a current coding block may be predicted by carrying out the method with the terms "chroma" and "luma" interchanged.

Included among the procedures, methods, architectures, apparatuses, systems, devices, and computer program products is a method that includes using a unified linear model parameter estimation approach for various template-based video coding techniques, such as LIC and CCLM is provided. In an embodiment, a LIC parameter computation may employ a linear model in accordance with a legacy CCLM (e.g., CCLM-SLE). In an embodiment, both LIC and CCLM parameter computations may employ a linear model that is less burdensome on memory than convention CCLM versions (e.g., CCLM-SLE). In an embodiment, statistical methods and/or measurements of (e.g., mean and variance or other statistical method of a distribution of) luma and/or chroma samples may be used to compute linear model parameters (e.g., parameters $\alpha$ and $\beta$). In an embodiment, the statistical methods and/or measurements may be based, and/or application of the statistical methods and/or measurements may be conditioned, on an assumption that the distribution of the reconstruction and its prediction are correlated. In an embodiment, the statistical methods and/or measurements may be based, and/or application of the statistical methods and/or measurements may be conditioned, on a determination that the distribution of the reconstruction and its prediction are correlated.

Pursuant to the methodologies and technologies provided herein, parameter estimation robustness may be improved over legacy solutions due to using statistical measurements to calculate the scaling factor $\alpha$ and offset $\beta$. In an embodiment, an outlier removal technique may be employed using statistical measurements. Removal of outliers may increase robustness over legacy CCLM.

In the description that follows, a min-max based approach may be used to to compute linear model parameters. One skilled in the art will recognize that a weighted prediction based approach to calculate such parameters may be used as well.

Among the methods directed to an improved linear model estimation for template-based video coding is a method that may include any of generating a model for any of various template-based video coding techniques based on parameters thereof being estimated or otherwise determined using a unified linear model, and performing a template-based video coding using the generated model.

In an embodiment, the various template-based video coding techniques may include any of CCLM and LIC. In an embodiment, the template-based coding techniques utilize the same or like-type model parameters. In an embodiment, the model parameters comprise any of a slope and an offset.

In an embodiment, the method may include estimating or otherwise determining the model parameters using the unified linear model and template samples. In an embodiment, the unified linear model may include any of a min-max based approach and a weighted prediction based approach.

In an embodiment, the template samples may include any of luma and chroma samples. In an embodiment, the template samples may include samples disposed above and/or to the left of a CU.

In an embodiment, the unified linear model may use statistical methods (e.g., descriptive statistics) on and/or measurements of template samples to compute the model parameters. In an embodiment, the statistical methods and/or measurements may include any of a mean, a median, a variance and a standard deviation.

In an embodiment, the method may include removing outliers among the template samples (e.g., prior to computing the model parameters). In an embodiment, the unified linear model may include any of a min-max based approach and a weighted prediction based approach.

Among the procedures, methods, architectures, apparatuses, systems, devices, and computer program products is an apparatus, which may include any of a processor and memory, configured to perform any of the methods and embodiments thereof directed to an improved linear model estimation for template-based video coding provided herein. In an embodiment, the apparatus may be, may be configured as and/or may be configured with elements of a WTRU.

Among the procedures, methods, architectures, apparatuses, systems, devices, and computer program products is a system, which may include any of a processor and memory, configured to perform any of the methods and embodiments thereof directed to an improved linear model estimation for template-based video coding provided herein. Also among the procedures, methods, architectures, apparatuses, systems, devices, and computer program products is an A tangible computer readable storage medium having stored thereon computer executable instructions for performing any of the methods and embodiments thereof directed to an improved linear model estimation for template-based video coding provided herein.

Figure 12:
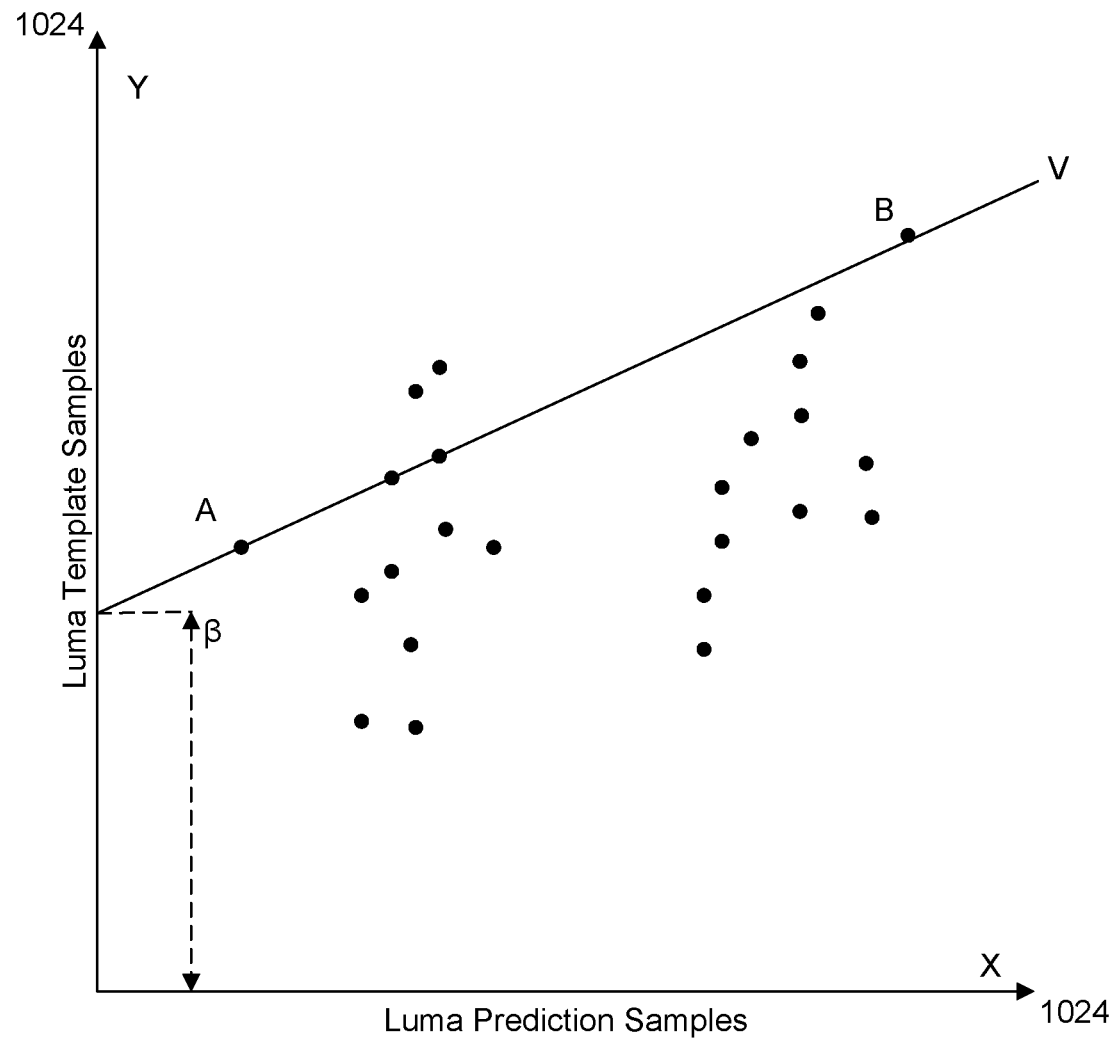
FIG. 12 illustrates an example LIC straight line estimation model for deriving linear model parameters.

FIG. 12 illustrates an example LIC straight line estimation model for deriving linear model parameters. The linear model parameters α and β may be obtained using minimum and maximum luma prediction and luma template point pairs inside a set of neighboring luma samples (e.g., as shown) and the following equation.

$$\alpha = \frac{y_B - y_A}{x_B - x_A}, \beta = y_A - \alpha \cdot x_A \qquad (9)$$

where values along x axis $X_A$ and $X_B$ may be the template predicted luma values at points A and B, respectively, and values along y axis $y_A$ and $y_B$ may be the template luma values at points A and B, respectively.

In accordance with Eq. (4) and the problem formulation thereof, $\sigma_x^2$ may be a variance of $X_i$, $\sigma_y^2$ may be a variance of $Y_i$, $\sigma_{xy}$ may be a cross-correlation of $X_i$ and $Y_i$, and $$E\begin{pmatrix}X\\Y\end{pmatrix} = \begin{pmatrix}\mu_x\\\mu_y\end{pmatrix}, \text{cov}\begin{pmatrix}X\\Y\end{pmatrix} = \begin{pmatrix}\sigma_x^2 & \sigma_{xy}\\\sigma_{xy} & \sigma_y^2\end{pmatrix} \qquad (10)$$

Assuming E(Y|X) is the best predictor of Y and the best predictor is a linear function, E(Y|X) may coincide with the best linear predictor of Y. The derivations set forth in Eq. (11)-(13) below are for the case when the conditional expectation is linear [Eq. (10)].

$$\alpha = \frac{\sigma_{xy}}{\sigma_x^2}, \beta = \mu_y - \alpha \cdot \mu_x \qquad (11)$$

The unified linear model parameter estimation approach, in an embodiment, may employ a mathematical model to statistically determine the offset and the slope based on the input data distribution. Eq. (10) may be derived using the expected value of the linear model to fit the data as follows.

$$E(Y) = aE(X) + b \qquad (12)$$

$$E\left[(Y - \hat{Y})^2\right] = E\left[(Y - a\hat{X} - b)^2\right] = a^2 E\left[(X - \hat{X})^2\right]$$

The slope may be calculated as a ratio of standard deviations of the two distributions given by:

$$\alpha = \frac{\sigma_y}{\sigma_x}, \beta = \mu_y - \alpha \cdot \mu_x \qquad (13)$$

Representative Template Selection for LIC Parameter Derivation

Figure 13:
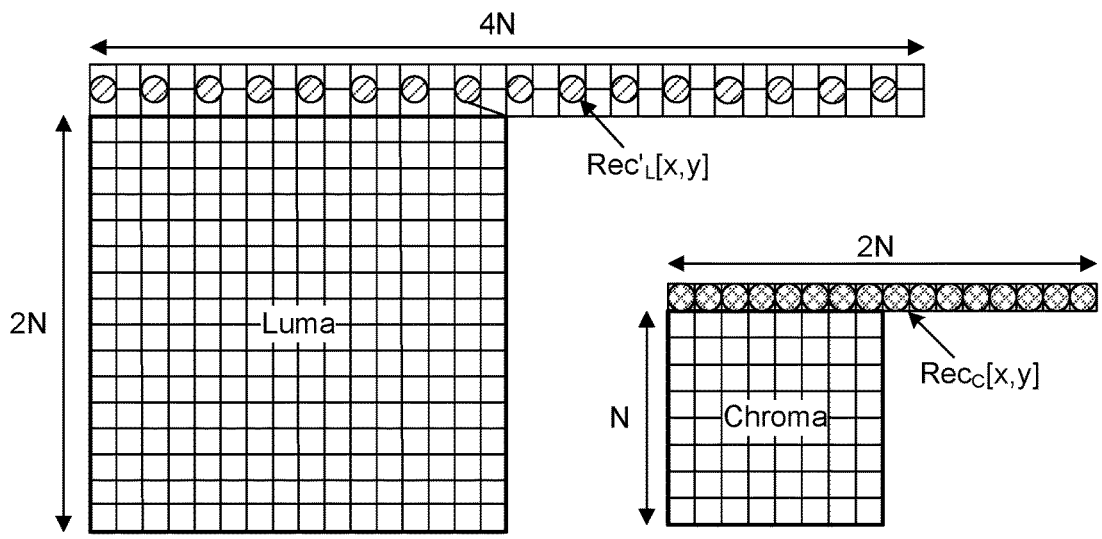
FIG. 13 is a block diagram illustrating an example linear model mode based on above samples (LM_A mode) for any of CCLM and LIC straight line estimation models.
Figure 14:
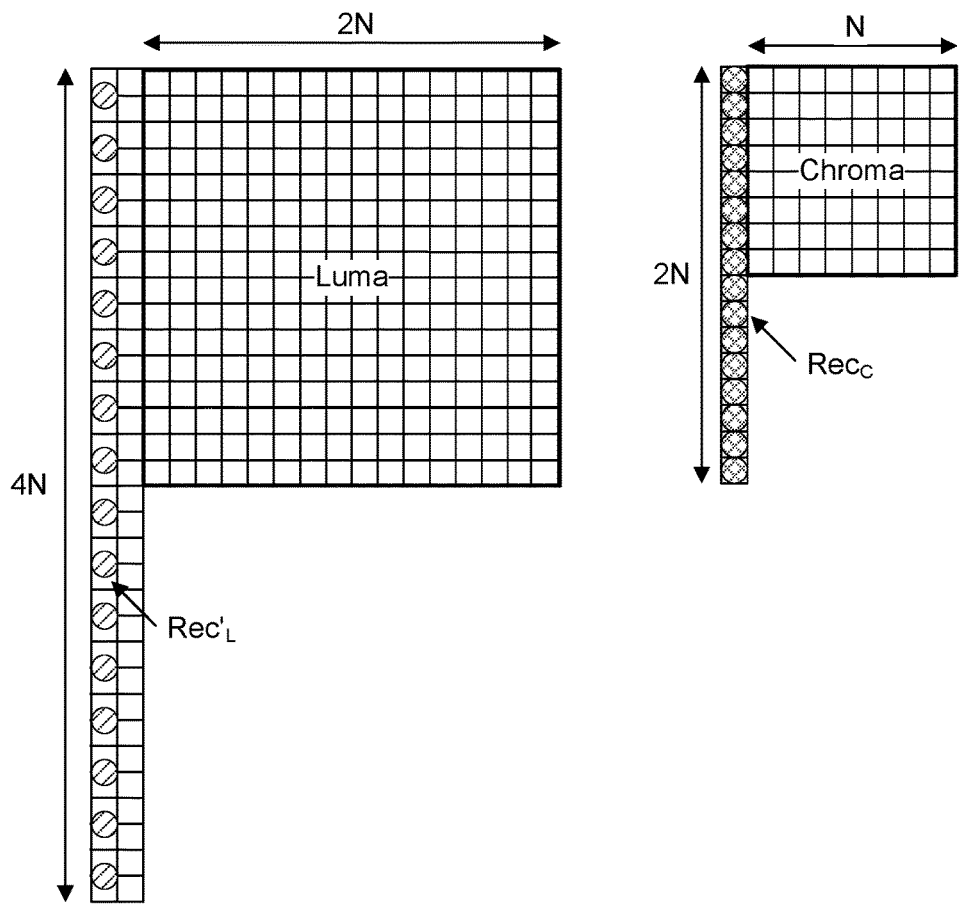
FIG. 14 is a block diagram illustrating an example linear model mode based on left samples (LM_L mode) for any of CCLM and LIC straight line estimation models.

As an alternative (or in addition) to using the above and left templates together to calculate the linear model coefficients (akin to CCLM-SLE), the above and left templates may be used individually in an LM_A mode and an LM_L mode, respectively. FIGS. 13 and 14 are block diagrams illustrating example LM_A and LM_L modes, respectively. In in the LM_A mode (FIG. 13), only the above template may be used to calculate the linear model coefficients, whereas in LM_L mode (FIG. 14), only left template may be used to calculate the linear model coefficients. Example details of LM_A and LM_L modes, which may be representative of the LIC LM_A and LM_L modes, may be found in JVET-L0336.

Representative Multi-Model Extension for Parameter Derivation

Figure 15:
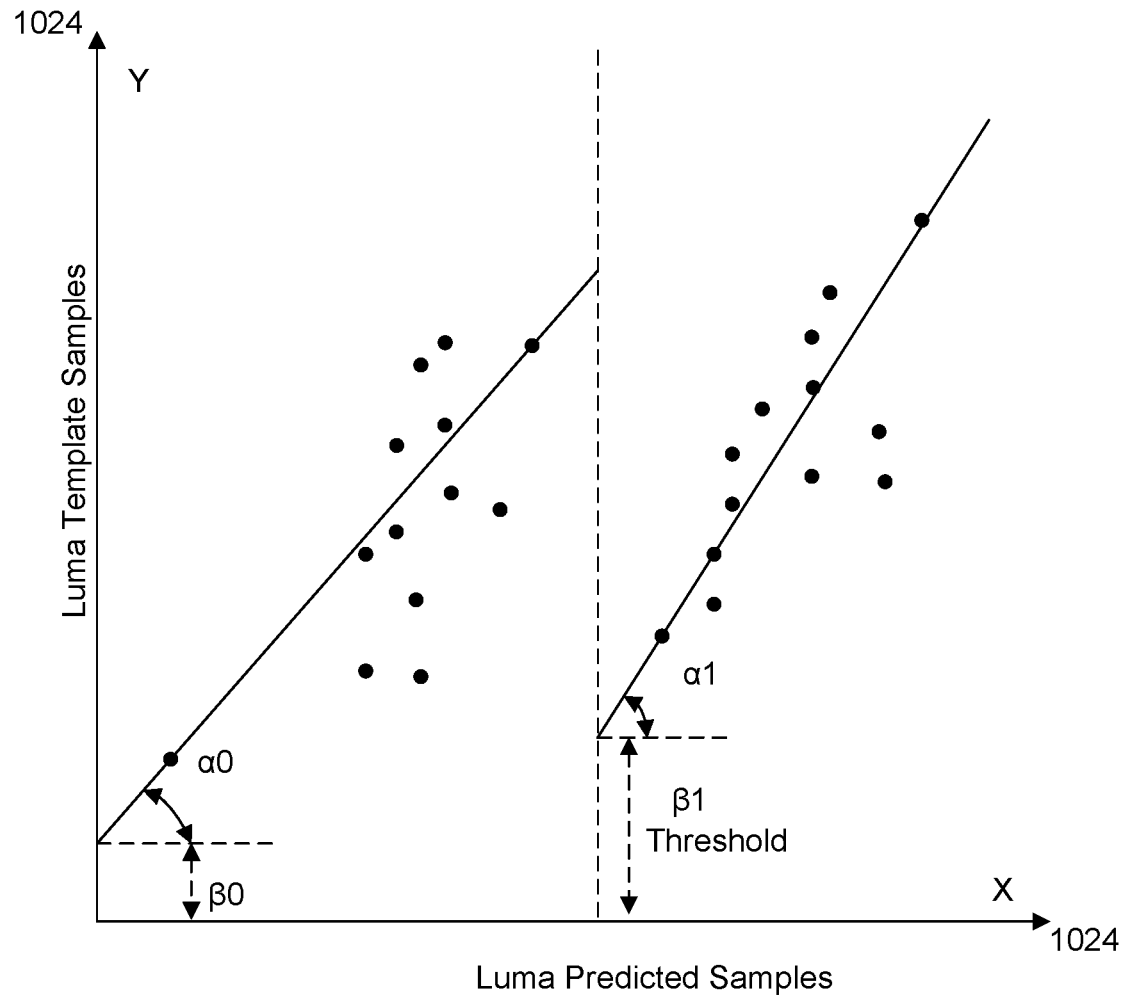
FIG. 15 illustrates an example multi-model parameter estimation approach having two LIC min-max based linear models.

The unified linear model parameter estimation approach for LIC and CCLM (e.g., the min-max based straight line estimation models disclosed herein) may be extended to a multi-model parameter estimation approach. One use case in which the multi-model parameter estimation approach may be particularly useful is when variation of the luminance variance cannot (or might not) be effectively modeled using a single model. The multi-model parameter estimation approach may use two or more linear models that are separated based on a threshold. Each group may be treated independently for training purposes to derive the unified linear model parameter estimation approach for either LIC or CCLM linear model parameters α and β. The multi-model parameter estimation approach may be considered as a simplification to the K-mean clustering approach with n groups. Each of the n groups for the linear regression may have enough samples to compute α and β. FIG. 15 illustrates an example multi-model parameter estimation approach having two LIC min-max based linear models ("multi-model LIC"). Although not shown, a multi-model parameter estimation approach having two CCLM min-max based linear models will be apparent to those skilled in the art from the descriptions accompanying FIG. 15 herein.

The min-max based linear model may perform better than the LS algorithm in smooth regions that possess higher correlation as compared to textured regions where a single linear model might not effectively depict the data distribution. In an embodiment, the multi-model min-max approach may model an LS approximation. Such multi-model min-max approach may better characterize the variation in texture along with luminance variation.

Figure 16:
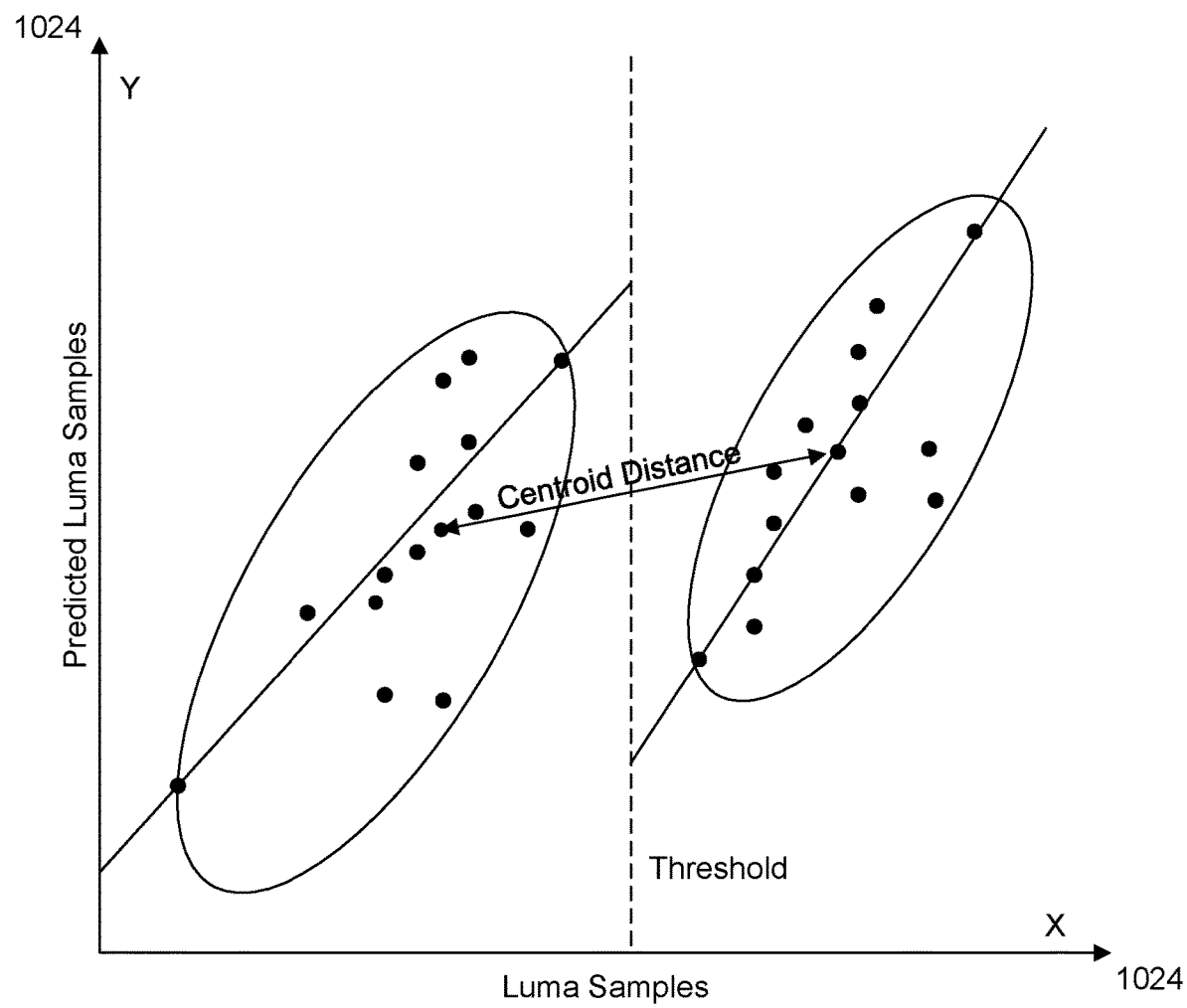
FIG. 16 illustrates example point distribution driven selection of multi-model vs. single-model LIC.

The multi-model LIC may be mathematically represented as:

$$y = \begin{cases} \alpha_0 x + \beta_0 & x < \text{Threshold} \\ \alpha_1 x + \beta_1 & x \geq \text{Threshold} \end{cases} \quad (14)$$

where each group may be treated independently. Alternatively, if the data suggests that the groups can be merged into a single cluster, then groups may be merged notwithstanding that two classifiers may model the point distribution. As an example, and with reference to FIG. 16, if a distance between centroids of the two groups is less than or otherwise satisfies a threshold, the groups may be merged to form a single cluster and treated together (even though two classifiers may model the distribution). The number of data points in each cluster may serve as a measure to guarantee that each region has a sufficient amount of data points for effectively modeling the classifier. Based on the occurrence of the data points, such an approach can be regarded as a piece-wise linear model of the data.

Representative Procedure for Multi-Model LIC Classifier

The point distribution may be separated into two regions using a threshold. The threshold may be or be based on an average of luma samples. Alternatively, the threshold may be based on any of various histogram analyses, including for example, as set forth in J. Liu, S. Wu, and J. V. Zidek, "On segmented multivariate regression," Statist. Sinica, vol. 7, no. 2, pp. 497-525, 1997.

A distance between centroids of the two regions may be calculated. This distance may be calculated in various ways. As an example, for a first of the two clusters, a distance ($D_1$) between data points and centroid in that cluster may be calculated. For the second of the two clusters, a distance ($D_2$) between data points and centroid in that cluster may be calculated. A distance ($D_N$) between the two centroids may be calculated. On condition that ($D_N \leq \lambda^*(D_1+D_2)$), the two regions may be merged into a single region, and a single min-max approach may be used to estimate/determine $\alpha$ and $\beta$. On condition that $D_N > \lambda^*(D_1+D_2)$), the multi-model min-max approach may be used to estimate/determine $\alpha_0$, $\beta_0$ and $\alpha_1$, $\beta_1$.

The distance ($D_N$) may be computed as a Euclidean distance or a Manhattan distance. $\lambda$ may be a pre-defined threshold (e.g., 1.0). If the distance ($D_N$) between the centroids is sufficiently large, the encoder may decide to use either the single classifier or multi classifier model based on a rate distortion optimization (RDO) criteria. In an embodiment, a context coded CU level flag may be signaled by the encoder to indicate a choice of the model selection. The decoder may use the flag to carry out model selection.

SEE FIG. 18 BELOW.

Representative LIC Interaction with GBi

As noted above, a prediction signal of generalized bi-prediction is computed as a weighted average of the two prediction blocks as follows:

$$P[x]=(1-w)\times P_0[x+v_0]+w\times P_1[x+v_1] \quad (15)$$

where, P[x] is the prediction of current block sample x located at picture position x, each $P_i[x+v_i]$ is a motion compensated prediction of x using a motion vector (MV) $v_i$ from a reference picture in reference list Li, 1−w and w denote weight values applied respectively to $P_0[x+v_0]$ and $P_1[x+v_1]$.

For each CU coded with LIC followed by GBi, the prediction in Eq. (15) may be re-formulated as:

$$P[x]=(1-w)\times(\alpha_0 \times P_0[x+v_0]+\beta_0)+w\times(\alpha_1 \times P_1[x+v_1]+\beta_1) \quad (16)$$

where, $\beta_0$ and $\beta_1$ may be the derived offset values used to correct the DC values of $P_0$ and $P_1$ respectively, and $\alpha_0$ and $\alpha_1$ may be the slopes. If LIC is applied after GBi, then for each CU coded with GBi followed by LIC, the prediction in Eq. (15) may be re-formulated as:

$$P'[x]=(\alpha'\times P[x]+\beta') \quad (17)$$

where, $\beta'$ may be the derived offset values used to correct the DC values of P' and $\alpha'$ may be the LIC slope. Applying the LIC after GBi is less computationally expensive than applying LIC followed by GBi in that with the latter LIC may be carried out twice (e.g., for both of $P_0$ and $P_1$), whereas with the former LIC may be carried out once (e.g., for P').

Representative CCLM Computation

As noted above, the computation of the CCLM parameters may use as input both of a MSB and a LSB obtained from the MSB LUT and the LSB LUT, respectively. Population of the MSB and LSB LUTs may be carried out in accordance with Eq. (8). The memory consumed for instantiating the MSB and LSB LUTs may be, for example, 2 Kbytes (e.g. 2 LUTs×16-bit precision−2 LUTs×(2 bytes× 512 entries)). In an embodiment, the CCLM parameters may be computed using the MSB and without using the LSB. Not using the LSB in the computation may eliminate the LSB LUT (e.g., 512 entries at 16 bits each) and the burden (e.g., 1 Kbyte) for storing it in memory.

The MSB LUT may be populated using the following $$MSB = \text{floor}\left(\frac{2^n}{\text{diff}}\right) \quad (18)$$

where a calculation precision of n=16 bits may be used.

Computation of the CCLM model parameters $\alpha$ and $\beta$ using the MSB LUT (and not the LSB) may be carried out as follows. The minimum and maximum values of the luma and chroma parameters may be determined. The determined minimum and maximum values of the luma and chroma parameters may be used as input to a calculation that may be carried out in accordance with the following pseudo code ("Pseudo code B"):

```
shift = (BitDepthC > 8) ? BitDepthC − 9 : 0
add = shift ? 1 << (shift - 1) : 0
diff = (MaxLuma - MinLuma + add) >> shift
k = 16
If (diff > 0)
    α = (((ChromaForMaxLuma - ChromaForMinLuma) * (MSB) +
    add) >> shift)
Otherwise,
    α = 0
β = ChromaForMinLuma - ((a * MinLuma) >> k)
        Pseudo Code B – Single LUT Linear Model Parameter
        Estimation
``` where BitDepthC may be the chroma bit-depth, MaxLuma may be the maximum value of down-sampled top and left neighboring luma samples, MinLuma may be the minimum value of down-sampled top and left neighboring luma samples, ChromaForMaxLuma may be chosen from top and left neighboring reconstructed chroma samples and may correspond to the chroma for the maximum value of luma, ChromaForMinLuma may be chosen from top and left neighboring reconstructed chroma samples and may correspond to the chroma for the minimum value of luma samples.

According to the pseudo code above, the parameter BitDepthC may restrict the chroma bit-depth to 9 bits and the parameters α (slope) and β (offset) may be calculated at 16 bits precision using the MSB LUT values (and without a LSB and a LSB LUT). According to experimental results, no significant difference was found when the model parameters α and β are computed using both of the MSB and LSB verses using the MSB and not the LSB. As observed, the error generated by calculating in 16 bits precision is negligible. Errors (if any) that might be mitigated by the use of the LSB are, in large part, due to the reduction in precision by computing BitDepthC at the restricted bit-depth (9 bits).

In an embodiment, the CCLM parameters may be computed using both of the MSB and LSB, but not using a MSB LUT. Not using the MSB LUT (e.g., 512 entries at 16 bits each) in the computation may eliminate the burden (e.g., 1 Kbyte) for storing the MSB LUT in memory. In an embodiment, the difference between minimum and maximum sample values may be computed using 8-bit precision. The MSB may be calculated (e.g., using a measurement) based on an average of the floor and the ceiling. Basing the calculation of an average of the floor and the ceiling may mitigate losses stemming from using the floor function and not the ceiling function. Losses incurred by computing the MSB without the MSB LUT may be mitigated by using an LSB from the LSB LUT. The LSB may be computed with 16-bit (or higher) precision, and the LSB LUT may include 512 (or more) entries. Alternatively, the LSB may be calculated using 8-bit precision and the LSB LUT may include 256 entries without significantly degrading performance. In addition to complexity reduction, the memory burden for a LSB LUT having 256 entries at 8-bit precision is 256 bytes (instead of the 1 Kbyte required for a LSB LUT having 512 entries at 16-bit precision). Combinations of computation precision and LUT size other than 8-bit precision and 256 entries may be used as well.

The MSB computation (without any LUT) may be calculated as follows.

$$MSB = (2^{n-floorLog2(diff)} + 2^{n-1-floorLog2(diff)}) >> 1 \quad (19)$$

where foor(Log2(diff)) may be the floor of the log base 2 of the input, diff (non-negative) may be the difference between minimum and maximum sample values, and n may be the calculation precision (e.g., 16-bit, 8-bit, etc.).

The LSB LUT may be populated using $$LSB = 2^n \left\{ \frac{2^n}{diff} - MSB \right\} \quad (20)$$

where MSB may be from Eq. (19), diff (non-negative) may be the difference between minimum and maximum sample values, and n may be the calculation precision (e.g., 16-bit, 8-bit, etc.). Computation of the CCLM model parameters α and β using both of the MSB (e.g., values computed based on Eq. (19)) and an LSB LUT (e.g., populated using Eq. (20)), but not using a MSB LUT may be carried out as follows. The minimum and maximum value of the luma and chroma parameters may be determined. The determined minimum and maximum values of the luma and chroma parameters may be used as input to a calculation that may be carried out in accordance with the following pseudo code ("Pseudo code C"):

```
shift = (BitDepthC > 8) ? BitDepthC - 9 : 0
add = shift ? 1 << (shift - 1) : 0
diff = (MaxLuma - MinLuma + add) >> shift
k= 16, 8, etc
If (diff > 0)
    div = ((ChromaForMaxLuma - ChromaForMinLuma) * (LSB) >> k
    α = (((ChromaForMaxLuma - ChromaForMinLuma) * (MSB) +
div + add) >> shift)
Otherwise,
    α = 0
β = ChromaForMinLuma - ((a * MinLuma) >> k)
    Pseudo Code C – Reduced Precision Linear Model Parameter
    Estimation
``` where BitDepthC may be the chroma bit-depth, MaxLuma may be the maximum value of the down-sampled top and left neighboring luma samples, MinLuma may be the minimum value of the down-sampled top and left neighboring luma samples, ChromaForMaxLuma may be chosen from top and left neighboring reconstructed chroma samples and may correspond to the chroma for the maximum value of luma, ChromaForMinLuma may be chosen from top and left neighboring reconstructed chroma samples and may correspond to the chroma for the minimum value of luma samples.

According to the pseudo code above, the parameter BitDepthC may restrict the chroma bit-depth to 9 bits, and the parameters α (slope) and and β (offset) may be calculated at any of n-bit precision using the LSB LUT values. The MSB computation may be performed using bit-wise shift operations, and without a MSB LUT. The error margin introduced by the MSB computation, if any, may be mitigated by the LSB, and such mitigation may overcome error margins introduced by lower computation precision. According to experimental results, the CCLM model parameters may be computed at 8-bit precision and using a LSB LUT having 64 entries with negligible loss for the Common Test Condition sequences. The CCLM model parameters may be computed using precision other than 8 bits and using a LSB LUT having more or fewer than 64 entries. Minor gains in some cases or negligible loss for the Common Test Condition sequences were observed using various combinations of computation precision and LSB LUT sizes.

Representative CCLM Robustness Techniques

The straight-line approximation may be susceptible to errors due to outliers because it is dependent on selection of minimum and maximum values. In an embodiment, the outliers may be removed by discarding, for example, less than γ of the mean value of template samples and more than δ times the mean value of the template samples. The values of γ and δ may be empirically determined from the Common Test Condition sequences in which mean, minimum and maximum values are used to determine γ and δ. Additionally, and/or alternatively, a median measurement may be used instead of the mean measurement. Additionally, and/or alternatively, other statistical measurements, e.g. variance or outlier removal using K-mean clustering approach, may be used.

Figure 17:
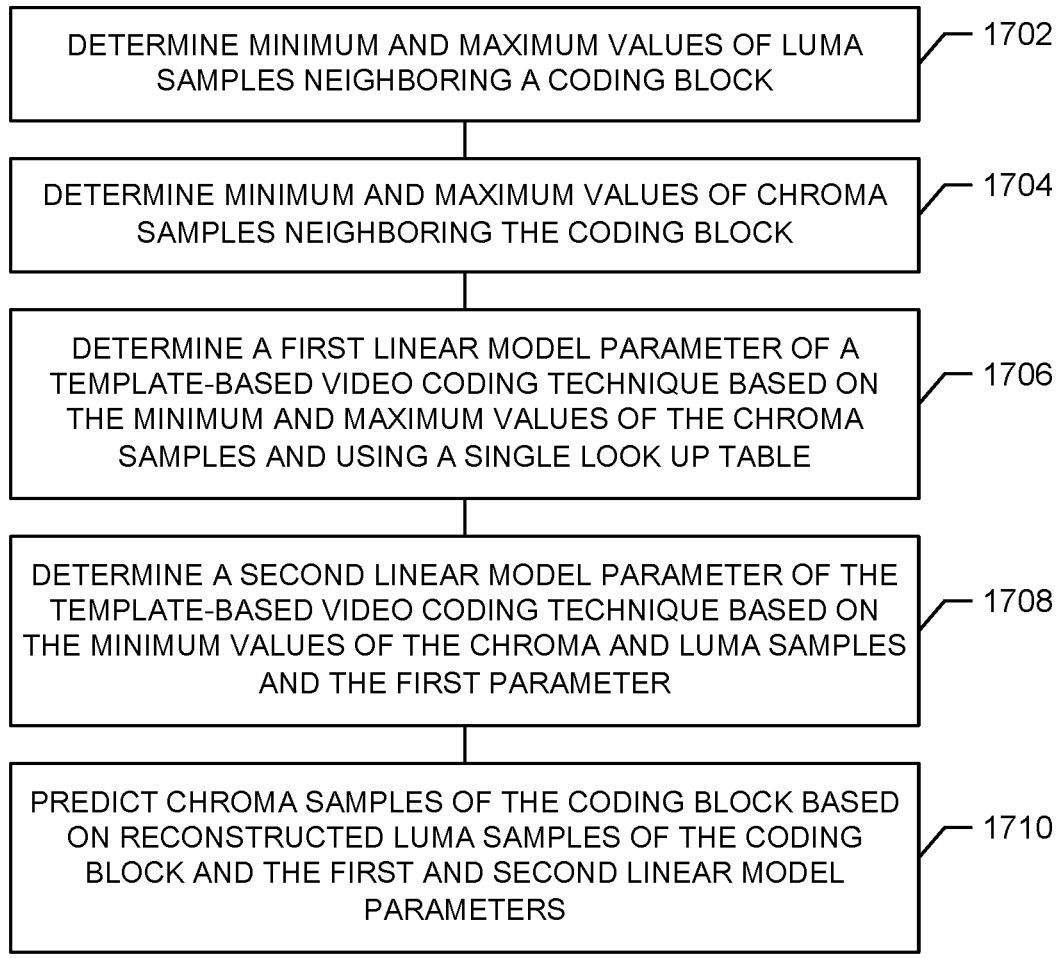
FIG. 17 is a flow diagram illustrating an example flow in accordance with one or more embodiments.

FIG. 17 is a flow diagram illustrating an example flow 1700 in accordance with one or more embodiments. Pursuant to the flow 1700, chroma components of a current coding block may be predicted using a straight-line estimation model/method employed by a template-based coding technique, such as CCLM, LIC, etc., in which linear model parameters are computed using a LUT and at a precision no greater than 16 bits (e.g., as a result of the LUT configuration). The flow 1700 may be carried out by an apparatus (e.g., device, system, WTRU, etc.) and/or any of an encoder and a decoder implemented in such apparatus (collectively "apparatus" in the description of flow 1700 that follows).

Referring to FIG. 17, the apparatus may determine minimum and maximum values of luma samples neighboring a coding block (1702). The apparatus may determine minimum and maximum values of chroma samples neighboring the coding block and corresponding to the minimum and maximum values of the luma samples, respectively (1704). The apparatus may determine (e.g., compute) a first linear model parameter of a template-based video coding technique (e.g., slope) based on the minimum and maximum values of the chroma samples and using a single LUT (1706). For example, the device may compute the first linear model parameter at a precision no greater than 16 bits as a function of the minimum and maximum values of the chroma samples and using the single LUT. In an embodiment, the single LUT may exclude values for determining a least significant bit. Alternatively, the single LUT may include values for determining a least significant bit only (e.g., only an LSB LUT) or values for determining a most significant bit only (e.g., only an MSB LUT).

The apparatus may determine a second linear model parameter of the template-based video coding technique (e.g., intercept) based on the minimum values of the chroma and luma samples and the first parameter (1708). For example, the apparatus may compute the second linear model parameter at a precision no greater than 16 bits as a function of the minimum values of the chroma and luma samples along with the first linear model parameter. In an embodiment, the apparatus may compute the first and second linear model parameters based on Eq. (18) or a variation thereof and an instantiation of Pseudo code B. The apparatus may predict chroma samples of the coding block based on reconstructed luma samples of the coding block and the first and second linear model parameters (1710).

In an embodiment, the minimum and maximum values of the luma and chroma may correspond to respective templates. In an embodiment, the minimum and maximum values of the luma and chroma may correspond to the respective templates but might not include all samples of such templates. Although not shown in FIG. 17, the apparatus may prune one or more samples of the luma template to obtain the luma samples used for (e.g., prior to) determining the minimum and maximum values of the luma samples (1702) and/or prune one or more samples of the luma template to obtain the luma samples used for (e.g., prior to) determining the minimum and maximum values of the luma samples (1704). In an embodiment, the pruning of the luma/chroma samples may include outlier removal or otherwise excluding one or more samples of the luma/chroma template based on statistical methods, e.g., based on descriptive statistics (e.g., as described herein). In an embodiment, the luma and chroma samples belong to a point distribution having a single region (e.g., as shown in FIG. 11) or to one of a plurality of regions of the point distribution (e.g., one on the regions shown in FIG. 15).

Although not shown, those skilled in the art will all recognize that the apparatus may determine minimum and maximum values of chroma samples neighboring the coding block (1702) and then may determine minimum and maximum values of luma samples neighboring the coding block that correspond to the minimum and maximum values of the chroma samples, respectively (1704). In addition, those skilled in the art will realize that luma components of a current coding block may be predicted using the flow 1700, as well (e.g., by interchanging the terms "chroma" and "luma").

Figure 18:
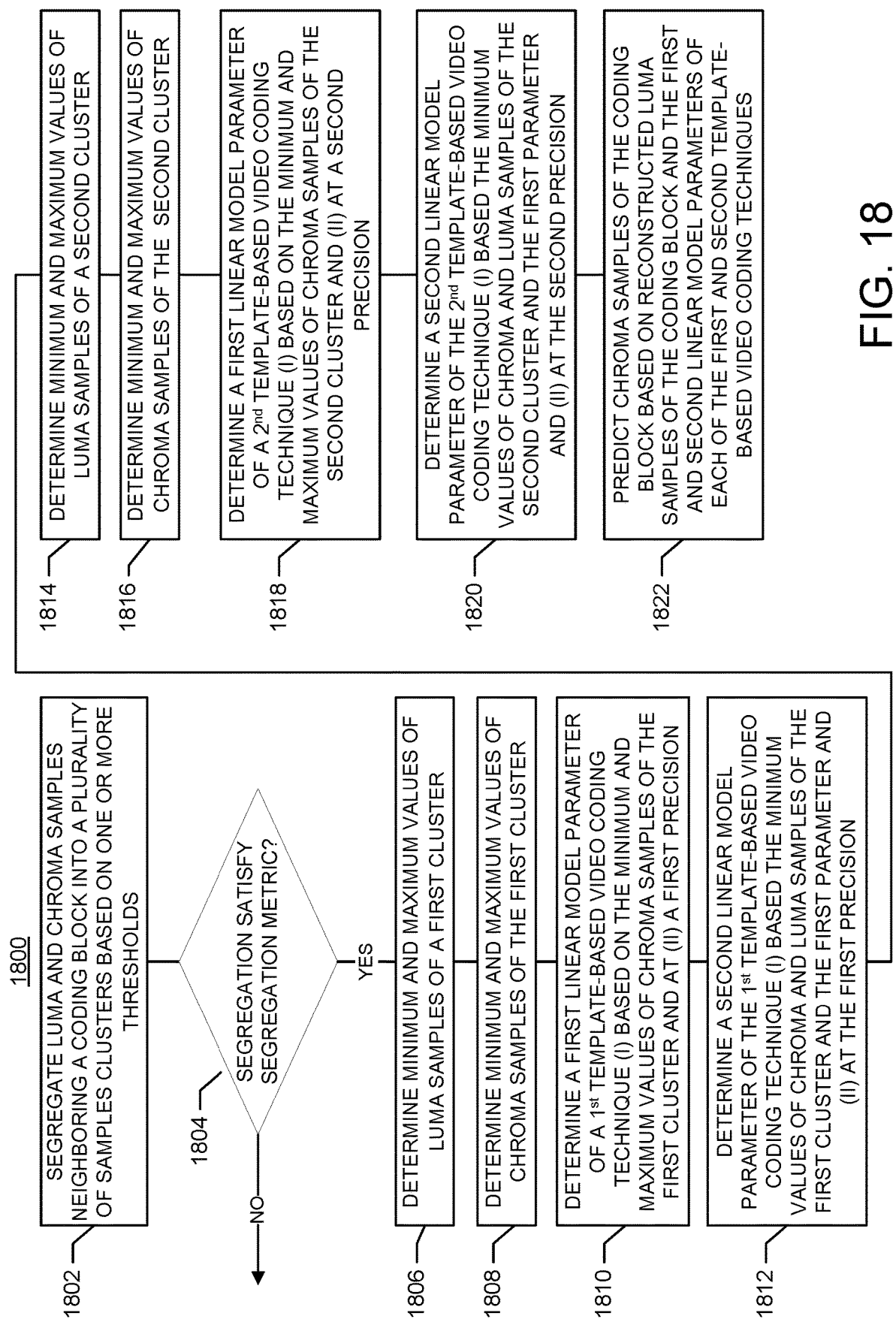
FIG. 18 is a flow diagram illustrating an example flow in accordance with one or more embodiments.

FIG. 18 is a flow diagram illustrating an example flow 1800 in accordance with one or more embodiments. Pursuant to the flow 1800, chroma components of a current coding block may be predicted using multiple straight-line estimation models/methods employed by one or more template-based coding techniques, such as CCLM, LIC, etc. The flow 1800 may be carried out by an apparatus (e.g., device, system, WTRU, etc.) and/or any of an encoder and a decoder implemented in such apparatus (collectively "apparatus" in the description of flow 1800 that follows).

Referring to FIG. 18, the apparatus may segregate luma and chroma samples neighboring a coding block into a plurality of samples clusters based on one or more thresholds (1802). In an embodiment, at least one of the thresholds may be based on an average of the luma samples neighboring the coding block.

The apparatus may determine whether the segregation of first and second samples clusters satisfies a segregation metric (1804). The segregation metric may be, for example, the distance metric described under the heading Representative Procedure for Multi-Model LIC classifier above and/or based on the segregation threshold determined by Otsu's method or based on Linear Discriminant Analysis (LDA) applied to the luma samples. On condition that the segregation of any two clusters does not satisfy the segregation metric, the apparatus may recombine the two clusters and proceed with prediction using a single straight-line estimation model/method employed by a template-based coding technique, such as in flow 1700 (FIG. 17), otherwise the apparatus continues to carry out the flow 1800.

The apparatus may determine minimum and maximum values of the luma samples of a first samples cluster (1806). The apparatus may determine minimum and maximum values of the chroma samples of the first samples cluster that correspond to the minimum and maximum values of the luma samples of the first samples cluster, respectively (1808). The apparatus may determine (e.g., compute) a first linear model parameter of a first template-based video coding technique (e.g., slope) (i) based on the minimum and maximum values of the chroma samples of the first samples cluster and (ii) at a first precision (1810). The apparatus may determine a second linear model parameter of the first template-based video coding technique (e.g., intercept) (i) based on the minimum values of the chroma and luma samples of the first samples cluster and the first parameter and (ii) at the first precision (1812).

The apparatus may determine minimum and maximum values of the luma samples of a second samples cluster (1814). The apparatus may determine minimum and maximum values of the chroma samples of the second samples cluster that correspond to the minimum and maximum values of the luma samples of the second samples cluster, respectively (1816).

The apparatus may determine (e.g., compute) a first linear model parameter of a second template-based video coding technique (e.g., slope) (i) based on the minimum and maximum values of the chroma samples of the second samples cluster and (ii) at a second precision (1818). The apparatus may determine a second linear model parameter of the second template-based video coding technique (e.g., intercept) (i) based on the minimum values of the chroma and luma samples of the second samples cluster and the first parameter of the second template-based video coding technique and (ii) at the second precision (1820). The apparatus may predict chroma samples of the coding block based on reconstructed luma samples of the coding block and the first and second linear model parameters of each of the first and second template-based video coding techniques (1822).

In an embodiment, the first linear model parameter of the first template-based video coding technique may be computed as a function of the minimum and maximum values of the chroma samples of the first samples cluster and one or more first look up tables. In an embodiment, the first linear model parameter of the second template-based video coding technique is computed as a function of the minimum and maximum values of the chroma samples of the second samples cluster and one or more look up tables. In an embodiment, any of the look up tables may exclude values for determining a least significant bit. In an embodiment, any of the look up tables may include values for determining a least significant bit only. In an embodiment, any of the look up tables may include values for determining a most significant bit only.

In an embodiment, the first precision may be based on a statistical description (e.g., distribution) of the samples within the first samples cluster. In an embodiment, the second precision may be based on a statistical description (e.g., distribution) of the samples within the second samples cluster. In an embodiment, the first linear model parameter of the first template-based video coding technique may be computed at a precision no greater than 16 bits. In an embodiment, the second linear model parameter of the first template-based video coding technique may be computed at a precision no greater than 16 bits. In an embodiment, the first linear model parameter of the second template-based video coding technique may be computed at a precision no greater than 16 bits. In an embodiment, the second linear model parameter of the first template-based video coding technique may be computed at a precision no greater than 16 bits.

In an embodiment, the minimum and maximum values of the luma and chroma may correspond to respective templates. In an embodiment, the minimum and maximum values of the luma and chroma may correspond to the respective templates but might not include all samples of such templates. Although not shown in FIG. 18, the apparatus may prune one or more samples of the luma and/or chroma templates prior to segregation (1802).

In an embodiment, the apparatus may prune one or more luma/chroma samples of the first samples cluster prior to determining minimum and maximum values of the luma/chroma samples of the first samples cluster and/or prune one or more luma/chroma samples of the second samples cluster prior to determining minimum and maximum values of the luma/chroma samples of the second samples cluster. In an embodiment, the pruning of the luma/chroma samples may include outlier removal or otherwise excluding one or more samples of the luma/chroma template based on statistical methods, e.g., based on descriptive statistics (e.g., as described herein).

Although not shown, those skilled in the art will all recognize that the apparatus may determine minimum and maximum values of chroma samples of the first (and/or second) samples cluster (1806, 1814) and then may determine minimum and maximum values of luma samples of the first (and/or second) samples cluster that correspond to the minimum and maximum values of the chroma samples, respectively (1808, 1816). In addition, those skilled in the art will realize that luma components of a current coding block may be predicted using the flow 1800, as well (e.g., by interchanging the terms "chroma" and "luma").

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶ 6 or means-plus-function claim format, and any claim without the terms "means for" is not so intended.

What is claimed is:

1. A method for encoding video data by an encoder, the method comprising:
coding a video block of the video data using a linear model of a template-based video coding technique, the coding comprises:
using a single look up table to determine a first parameter of the linear model, the single look up table including values for determining least significant bits, wherein the determining of the first parameter of the linear model comprises:
determining minimum and maximum values derived from luma samples neighboring the video block;
determining minimum and maximum values derived from chroma samples neighboring the video block; and
computing the first parameter of the linear model as a function of (i) the minimum and the maximum values of the chroma samples and (ii) a reciprocal of a difference between the minimum and the maximum values of the luma samples, wherein the reciprocal is derived from the single look up table, and
predicting samples of the video block based on the linear model.

2. The method according to claim 1, further comprising:
computing a second parameter of the linear model as a function of the minimum value of the chroma samples, the minimum value of the luma samples, and the first parameter of the linear model.

3. The method according to claim 2, wherein the second parameter is computed at a precision that is less than or equal to 16 bits.

4. The method according to claim 1, wherein the first parameter is computed at a precision that is less than or equal to 16 bits.

5. The method according to claim 1, wherein the template-based video coding technique is based on a cross component linear model (CCLM) or a local illumination compensation (LIC).

6. A method for decoding video data by a decoder, the method comprising:
decoding a video block of the video data using a linear model of a template-based video coding technique, the decoding comprises:
using a single look up table to determine a first parameter of the linear model, the single look up table including values for determining least significant bits, wherein the determining of the first parameter of the linear model comprises:
determining minimum and maximum values derived from luma samples neighboring the video block;
determining minimum and maximum values derived from chroma samples neighboring the video block; and
computing the first parameter of the linear model as a function of (i) the minimum and the maximum values of the chroma samples and (ii) a reciprocal of a difference between the minimum and the maximum values of the luma samples, wherein the reciprocal is derived from the single look up table, and
predicting samples of the video block based on the linear model.

7. The method according to claim 6, further comprising:
computing a second parameter of the linear model as a function of the minimum value of the chroma samples, the minimum value of the luma samples, and the first parameter of the linear model.

8. The method according to claim 7, wherein the second parameter is computed at a precision that is less than or equal to 16 bits.

9. The method according to claim 6, wherein the first parameter is computed at a precision that is less than or equal to 16 bits.

10. The method according to claim 6, wherein the template-based video coding technique is based on a cross component linear model (CCLM) or a local illumination compensation (LIC).

11. An encoder for encoding video data, comprising:
at least one processor; and
memory storing instructions that, when executed by the at least one processor, cause the encoder to:
code a video block of the video data using a linear model of a template-based video coding technique, the coding comprises:
using a single look up table to determine a first parameter of the linear model, the single look up table including values for determining least significant bits, wherein the determining of the first parameter of the linear model comprises:
determining minimum and maximum values derived from luma samples neighboring the video block;
determining minimum and maximum values derived from chroma samples neighboring the video block; and
computing the first parameter of the linear model as a function of (i) the minimum and the maximum values of the chroma samples and (ii) a reciprocal of a difference between the minimum and the maximum values of the luma samples, wherein the reciprocal is derived from the single look up table, and
predicting samples of the video block based on the linear model.

12. The encoder according to claim 11, wherein the instructions further cause the encoder to:
compute a second parameter of the linear model as a function of the minimum value of the chroma samples, the minimum value of the luma samples, and the first parameter of the linear model.

13. The encoder according to claim 12, wherein the second parameter is computed at a precision that is less than or equal to 16 bits.

14. The encoder according to claim 11, wherein the first parameter is computed at a precision that is less than or equal to 16 bits.

15. The encoder according to claim 11, wherein the template-based video coding technique is based on a cross component linear model (CCLM) or a local illumination compensation (LIC).

16. A decoder for decoding video data, comprising:
at least one processor; and
memory storing instructions that, when executed by the at least one processor, cause the decoder to:
decode a video block of the video data using a linear model of a template-based video coding technique, the decoding comprises:
using a single look up table to determine a first parameter of the linear model, the single look up table including values for determining least significant bits, wherein the determining of the first parameter of the linear model comprises:

determining minimum and maximum values derived from luma samples neighboring the video block;

determining minimum and maximum values derived from chroma samples neighboring the video block; and computing the first parameter of the linear model as a function of (i) the minimum and the maximum values of the chroma samples and (ii) a reciprocal of a difference between the minimum and the maximum values of the luma samples, wherein the reciprocal is derived from the single look up table, and predicting samples of the video block based on the linear model.

17. The decoder according to claim 16, wherein the instructions further cause the decoder to:

compute a second parameter of the linear model as a function of the minimum value of the chroma samples, the minimum value of the luma samples, and the first parameter of the linear model.

18. The decoder according to claim 17, wherein the second parameter is computed at a precision that is less than or equal to 16 bits.

19. The decoder according to claim 16, wherein the first parameter is computed at a precision that is less than or equal to 16 bits.

20. The decoder according to claim 16, wherein the template-based video coding technique is based on a cross component linear model (CCLM) or a local illumination compensation (LIC).

* * * * *